US010437252B1

(12) United States Patent
Liu et al.

(10) Patent No.: US 10,437,252 B1
(45) Date of Patent: Oct. 8, 2019

(54) HIGH-PRECISION MULTI-LAYER VISUAL AND SEMANTIC MAP FOR AUTONOMOUS DRIVING

(71) Applicant: Perceptln Shenzhen Limited, Shenzhen (CN)

(72) Inventors: Shaoshan Liu, Fremont, CA (US); Zhe Zhang, Sunnyvale, CA (US)

(73) Assignee: Perceptln Shenzhen Limited, Shenzhen (CN)

( * ) Notice: Subject to any disclaimer, the term of this patent is extended or adjusted under 35 U.S.C. 154(b) by 71 days.

(21) Appl. No.: 15/699,517

(22) Filed: Sep. 8, 2017

(51) Int. Cl.
*G05D 1/02* (2006.01)
*G01C 21/20* (2006.01)
*G01C 21/36* (2006.01)
*G05D 1/00* (2006.01)

(52) U.S. Cl.
CPC .......... *G05D 1/0246* (2013.01); *G01C 21/20* (2013.01); *G01C 21/36* (2013.01); *G01C 21/3691* (2013.01); *G05D 1/0022* (2013.01); *G05D 1/0212* (2013.01); *G05D 1/0278* (2013.01); *G05D 1/0287* (2013.01); *B60Y 2400/3015* (2013.01)

(58) Field of Classification Search
CPC .. G05D 1/0246; G05D 1/0022; G05D 1/0287; G05D 1/0278; G05D 1/0212; G01C 21/36; G01C 21/3691; G01C 21/20; B60Y 2400/3015
See application file for complete search history.

(56) References Cited

U.S. PATENT DOCUMENTS

| | | | | | |
|---|---|---|---|---|---|
| 8,565,958 | B1 * | 10/2013 | Montemerlo | G05D 1/024 701/25 |
| 8,825,391 | B1 * | 9/2014 | Urmson | G01C 21/32 701/448 |
| 2009/0234499 | A1 * | 9/2009 | Nielsen | B25J 9/161 700/250 |
| 2015/0012209 | A1 * | 1/2015 | Park | G01C 21/20 701/408 |

(Continued)

FOREIGN PATENT DOCUMENTS

| | | | |
|---|---|---|---|
| CN | 107137026 | A | 9/2017 |
| CN | 107153247 | A | 9/2017 |

(Continued)

OTHER PUBLICATIONS

Multilateration—Wikipedia, http://en.wikipedia.org/w/index.php?title=Multilateration&oldid=523281858, accessed Mar. 3, 2018, 5 pages.

(Continued)

*Primary Examiner* — Tyler J Lee
(74) *Attorney, Agent, or Firm* — Haynes Beffel & Wolfeld LLP; Ernest J. Beffel, Jr.

(57) ABSTRACT

Roughly described, a three-dimensional, multi-layer map is built employing sensory data gathering and analysis. The sensory data are gathered from multiple operational cameras and one or more auxiliary sensors. The multi-layer maps are stored in a map stored to be distributed to one or more autonomous vehicles and robots in the future. The techniques herein are described with reference to specific example implementations to implement improvements in navigation in autonomous vehicles and robots.

19 Claims, 24 Drawing Sheets

(56) References Cited

U.S. PATENT DOCUMENTS

| | | | | |
|---|---|---|---|---|
| 2015/0071524 A1* | 3/2015 | Lee | G06K 9/00208 382/154 |
| 2015/0219767 A1* | 8/2015 | Humphreys | G01S 19/43 342/357.26 |
| 2015/0268058 A1* | 9/2015 | Samarasekera | G06K 9/00637 701/409 |
| 2016/0209217 A1 | 7/2016 | Babu et al. | |
| 2016/0327653 A1* | 11/2016 | Humphreys | G01S 19/48 |
| 2018/0158197 A1* | 6/2018 | Dasgupta | G05D 1/0094 |
| 2018/0188032 A1* | 7/2018 | Ramanandan | G01S 19/53 |

FOREIGN PATENT DOCUMENTS

| | | | |
|---|---|---|---|
| CN | 107235013 | A | 10/2017 |
| CN | 107241441 | A | 10/2017 |
| CN | 107273881 | A | 10/2017 |
| CN | 107291080 | A | 10/2017 |
| CN | 107323301 | A | 11/2017 |
| CN | 107329478 | A | 11/2017 |
| CN | 107444179 | A | 12/2017 |
| CN | 107451611 | A | 12/2017 |
| CN | 107462892 | A | 12/2017 |
| CN | 107562660 | A | 1/2018 |
| CN | 206932609 | U | 1/2018 |
| CN | 206932645 | U | 1/2018 |
| CN | 206932646 | U | 1/2018 |
| CN | 206932647 | U | 1/2018 |
| CN | 206932653 | U | 1/2018 |
| CN | 206932676 | U | 1/2018 |
| CN | 206932680 | U | 1/2018 |
| CN | 206932902 | U | 1/2018 |
| CN | 206935560 | U | 1/2018 |
| CN | 206946068 | U | 1/2018 |
| CN | 207070610 | U | 3/2018 |
| CN | 207070612 | U | 3/2018 |
| CN | 207070613 | U | 3/2018 |
| CN | 207070619 | U | 3/2018 |
| CN | 207070621 | U | 3/2018 |
| CN | 207070629 | U | 3/2018 |
| CN | 207070630 | U | 3/2018 |
| CN | 207070638 | U | 3/2018 |
| CN | 207070639 | U | 3/2018 |
| CN | 207070641 | U | 3/2018 |
| CN | 207070652 | U | 3/2018 |
| CN | 207070703 | U | 3/2018 |
| CN | 207070709 | U | 3/2018 |
| CN | 207070710 | U | 3/2018 |
| CN | 207071933 | U | 3/2018 |
| CN | 207073092 | U | 3/2018 |
| CN | 207074202 | U | 3/2018 |
| CN | 207074269 | U | 3/2018 |
| CN | 207074560 | U | 3/2018 |
| CN | 207151236 | U | 3/2018 |
| CN | 207151465 | U | 3/2018 |
| CN | 207152927 | U | 3/2018 |
| CN | 207154149 | U | 3/2018 |
| CN | 207154238 | U | 3/2018 |
| CN | 207155071 | U | 3/2018 |
| CN | 207155773 | U | 3/2018 |
| CN | 207155774 | U | 3/2018 |
| CN | 207155775 | U | 3/2018 |
| CN | 207155776 | U | 3/2018 |
| CN | 207155817 | U | 3/2018 |
| CN | 207155818 | U | 3/2018 |
| CN | 207155819 | U | 3/2018 |
| CN | 207155840 | U | 3/2018 |
| CN | 207155841 | U | 3/2018 |
| CN | 207157464 | U | 3/2018 |
| CN | 207158940 | U | 3/2018 |
| CN | 207159724 | U | 3/2018 |
| CN | 207159810 | U | 3/2018 |
| CN | 207159811 | U | 3/2018 |
| CN | 207159812 | U | 3/2018 |
| CN | 207159840 | U | 3/2018 |
| CN | 207159970 | U | 3/2018 |
| CN | 207160626 | U | 3/2018 |
| CN | 207164589 | U | 3/2018 |
| CN | 207164772 | U | 3/2018 |
| CN | 207321871 | U | 5/2018 |
| CN | 207321872 | U | 5/2018 |
| CN | 207321889 | U | 5/2018 |
| CN | 207322208 | U | 5/2018 |
| CN | 207322217 | U | 5/2018 |
| CN | 207328169 | U | 5/2018 |
| CN | 207328170 | U | 5/2018 |
| CN | 207328818 | U | 5/2018 |
| CN | 207328819 | U | 5/2018 |
| CN | 207336762 | U | 5/2018 |
| CN | 207354913 | U | 5/2018 |
| CN | 207356393 | U | 5/2018 |
| CN | 207356394 | U | 5/2018 |
| CN | 207356420 | U | 5/2018 |
| CN | 207356421 | U | 5/2018 |
| CN | 207356422 | U | 5/2018 |
| CN | 207359050 | U | 5/2018 |
| CN | 207360243 | U | 5/2018 |
| CN | 207367052 | U | 5/2018 |
| CN | 207367336 | U | 5/2018 |
| CN | 207369157 | U | 5/2018 |
| CN | 207443447 | U | 6/2018 |
| CN | 207443493 | U | 6/2018 |
| WO | 2012040644 | | 3/2012 |

OTHER PUBLICATIONS

Rublee et al., "ORB: An efficient alternative to SIFT or SURF." Computer Vision (ICCV), 2011 IEEE international conference on. IEEE, 2011, 8 pages.

ORB Feature Detector and Binary Descriptor, http://scikit-image.org/docs/dev/auto_examples/features_detection/plot_orb.html (accessed Feb. 13, 2018), 3 pages.

Wahba, "A least squares estimate of satellite attitude," SIAM review 7, No. 3 (1965): 409-409.

U.S. Appl. No. 15/250,419—Non-Provisional Application filed Aug. 29, 2016, 83 pages.

U.S. Appl. No. 15/250,393—Non-Provisional Application filed Aug. 29, 2016, 68 pages.

U.S. Appl. No. 15/250,581—Non-Provisional Application filed Aug. 29, 2016, 70 pages.

U.S. Appl. No. 15/623,106—Non-Provisional Application filed Jun. 14, 2017, 85 pages.

U.S. Appl. No. 15/669,836—Non-Provisional Application filed Sep. 8, 2017, 83 pages.

U.S. Appl. No. 15/642,189—Non-Provisional Application filed Jul. 5, 2017, 80 pages.

U.S. Appl. No. 15/642,258—Non-Provisional Application filed Jul. 5, 2017, 83 pages.

Zhang et al., "PIRVS: An Advanced Visual-Inertial SLAM System with Flexible Sensor Fusion and Hardware Co-Design", Preprint submitted to 2018 IEEE International Conference on Robotics and Automation, Sep. 15, 2017, 7 pages.

Cadena et al., "Past Present, and Future of Simultaneous Localization and Mapping: Toward the Robust-Perception Age", IEEE Transactions on Robotics, IEEE Service Center, Piscataway, NJ, US, vol. 32, No. 6, Dec. 1, 2016, pp. 1309-1320, part 1.

Cadena et al., "Past Present, and Future of Simultaneous Localization and Mapping: Toward the Robust-Perception Age", IEEE Transactions on Robotics, IEEE Service Center, Piscataway, NJ, US, vol. 32, No. 6, Dec. 1, 2016, pp. 1321-1332, part 2.

* cited by examiner

2000

HIGH-PRECISION MULTI-LAYER VISUAL AND SEMANTIC MAP FOR AUTONOMOUS DRIVING

CROSS-REFERENCE TO OTHER APPLICATIONS

The following U.S. patent applications are incorporated by reference herein: U.S. Non-provisional application Ser. No. 15/250,419, filed Aug. 29, 2016, entitled "VISUAL-INERTIAL POSITIONAL AWARENESS FOR AUTONOMOUS AND NON-AUTONOMOUS DEVICE," U.S. Non-provisional application Ser. No. 15/250,393, filed Aug. 29, 2016, entitled "VISUAL-INERTIAL POSITIONAL AWARENESS FOR AUTONOMOUS AND NON-AUTONOMOUS TRACKING," U.S. Non-provisional application Ser. No. 15/250,581, filed Aug. 29, 2016, entitled "VISUAL-INERTIAL POSITIONAL AWARENESS FOR AUTONOMOUS AND NON-AUTONOMOUS MAPPING," U.S. Non-provisional application Ser. No. 15/623,106, filed Jun. 14, 2017, entitled "MONOCULAR MODES FOR AUTONOMOUS PLATFORM GUIDANCE SYSTEMS WITH AUXILIARY SENSORS," and U.S. Non-provisional application Ser. No. 15/699,836, filed Sep. 8, 2017, entitled "HIGH-PRECISION MULTI-LAYER VISUAL AND SEMANTIC MAP BY AUTONOMOUS UNITS.".

STATEMENT REGARDING PRIOR DISCLOSURES BY THE INVENTOR OR CO-INVENTOR UNDER 37 C.F.R. 1.77(b)(6)

A sensor device which can be used with some embodiments of the present invention, was described in commonly-owned, commonly-invented and non-published U.S. patent applications including: U.S. Non-provisional application Ser. No. 15/642,189, filed Jul. 5, 2017, entitled "QUADOCULAR SENSOR DESIGN IN AUTONOMOUS PLATFORMS," and U.S. Non-provisional application Ser. No. 15/642,258, filed Jul. 5, 2017, entitled "POSITIONAL AWARENESS WITH QUADOCULAR SENSOR IN AUTONOMOUS PLATFORMS." These applications are provided in a concurrently filed Information Disclosure Statement pursuant to the guidance of 78 Fed. Reg. 11076 (Feb. 14, 2013).

FIELD OF THE TECHNOLOGY DISCLOSED

The technology disclosed generally relates to self-guided vehicles and the construction of three-dimensional maps for autonomous mobile units and more particularly relates to the application processing visual, inertial, and radio navigational sensors data to positioning and guidance technologies.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

In recent years, there has been enormous interest in making vehicles smarter. Autonomous vehicles could free drivers of the burden of driving while enhancing vehicle safety. There has also been considerable interest in effective and reliable robotic delivery systems for handling intermittent, on-demand, or scheduled deliveries of items in a wide variety of environments. Ideally, delivery robots should be able to securely carry objects and remain stable while moving, and have a configuration that prevents object damage or loss.

For autonomous units such as autonomous vehicles and delivery robots to function properly in a wide variety of environments, sophisticated sensors capable of supporting autonomous navigation are needed. Such sensors can be used to identify and localize absolute or relative position, and detect stationary and non-stationary obstacles. Obstacle detection is particularly important for avoiding unwanted collisions.

Conventional obstacle avoidance commonly relies on long-distance rangefinders that actively scan the environment using laser, infrared, or sonar beams. While such active range finding sensor systems can provide highly accurate centimeter scale position data on millisecond timescales, they are relatively expensive. For example, laser-based sensors with a wide field of view can sense stationary or non-stationary obstacles by projecting a long-range laser beam and scanning it to bounce off any obstacles in order to detect the distance to the closest obstacle along that beam's path. The long-range laser beam effectively delivers a view of obstacles in a field of view around the sensor and provides mapping and/or obstacle avoidance data that can be used by autonomous units. But lasers are slow and can be costly. They are also subject to regulation.

Unfortunately, such sensors are costly and can be difficult to mount and position in an autonomous unit. Since sensor systems are a significant component of an autonomous unit's bill of materials, providing low-cost commercial delivery robots/autonomous vehicles depends at least in part upon use of low-cost sensor systems that are effective, rugged, and simple to calibrate and assemble.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

DESCRIPTION

Figure 1:
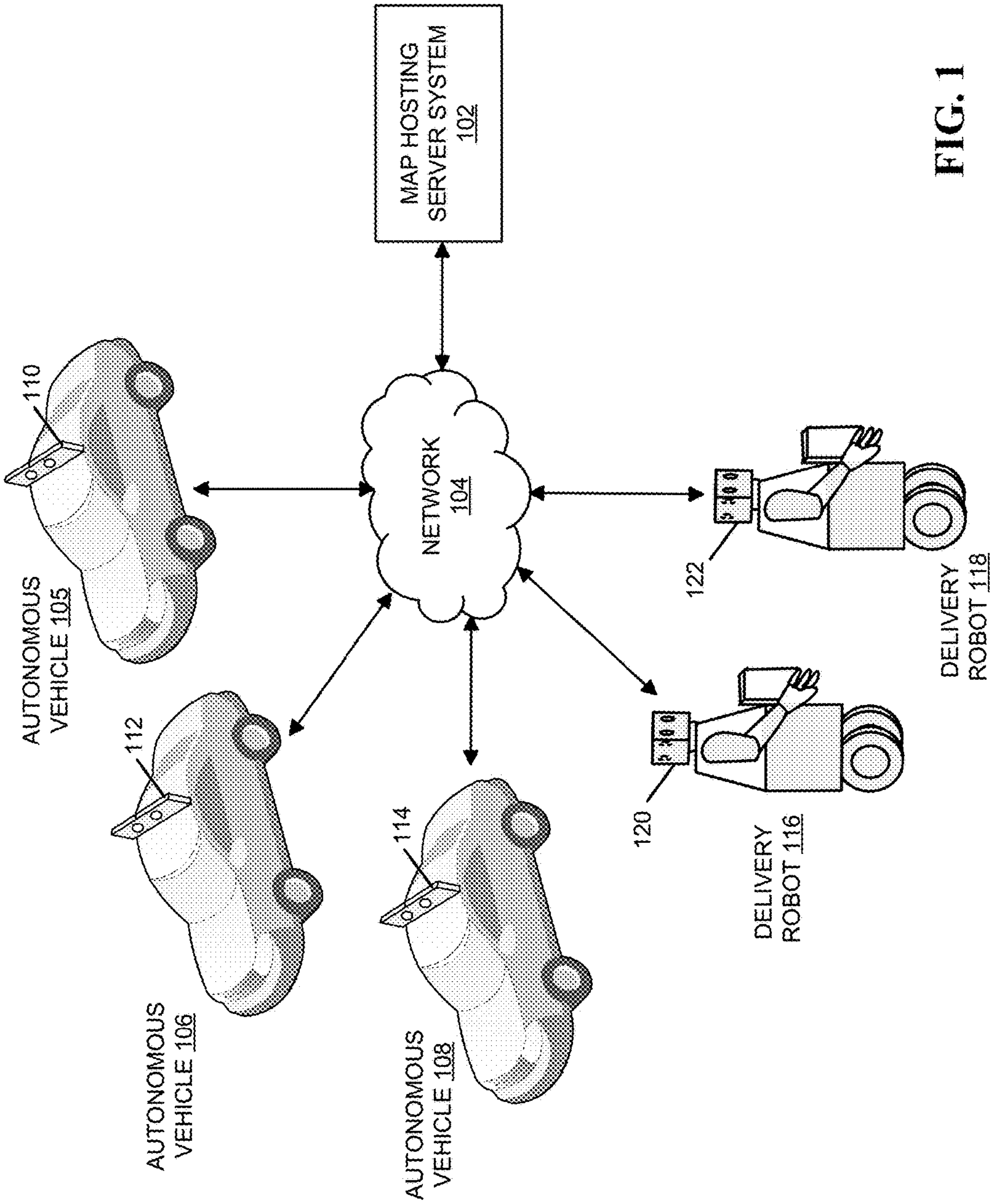
FIG. 1 shows an architectural level schematic of a multi-layer mapping system in accordance with an implementation.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

The discussion is organized as follows. First, a high-level description of one implementation will be discussed at an architectural level. Next, apparatuses and processes used by some implementations to efficiently process image and data from the auxiliary sensors and build a multi-layer map are discussed. The references to specific examples are intended to be illustrative of the approaches disclosed herein rather than limiting.

This document describes multi-layer map building techniques employed by an autonomous mobile unit by using visual sensory data from a multi-ocular system that provides a 360-degrees view. In one embodiment, the multi-ocular sensor includes four interfaces to couple with four cameras, each camera providing a field of view of at least 200 degrees. The four cameras are configured into two back-to-back pairs, whereby each pair of cameras can be disposed of horizontally or vertically with respect to the other pair of cameras. As each camera has a field of view of at least 200 degrees, each back-to-back pair of cameras provides a 360-degrees view. Therefore two back-to-back pairs of cameras will provide two 360-degrees views. By comparing these two 360-degrees views, the relative depth information of objects around the autonomous mobile unit can be obtained in the form of a disparity map, which encodes the difference in horizontal coordinates of corresponding image points. The values in this disparity map are inversely proportional to the scene depth at the corresponding pixel location. As used herein, the term "quadocular" will be used to describe a multi-ocular system that includes four cameras, each providing a field of view of at least 200 degrees. In other embodiments, the multi-ocular sensor may include more than one camera, each camera providing a field of view of more than 180 degrees. Such sensors can be used to identify and localize absolute or relative position, create maps through simultaneous localization and mapping (SLAM) or structure from motion (SfM), and detect stationary and non-stationary obstacles.

When an autonomous mobile unit moves, images by the quadocular system can be utilized to build a multi-layer map. Therefore, the pair of 360-degrees frames can be compared by extracting and matching key features in the frames. One main limitation of this process is the inaccurate estimation of the absolute depth scale or magnitude of the movement of the mobile unit. Indeed, even if camera pose estimation and scene reconstruction are carried out accurately, the error in the estimated depth of key features by stereo matching grows quadratically with depth or distance of the key features. In other words, the inaccuracy of the depth of key features in the far range is much higher than that in the near range. While the depth accuracy in the far range is unusably bad, the depth accuracy in the near range is significant. Some approaches suggest solving the issue via object detection by matching the scene with a pre-defined set of 3D models, so to recover the initial depth scale based on the estimated object size, which nevertheless fails in the absence of known shapes in the scene.

Data from one or more auxiliary sensors can be used to rectify the depth inaccuracy. In one embodiment, the auxiliary sensor can be a multi-axis inertial measurement unit (IMU), which measures and reports the mobile unit's linear acceleration using one or more accelerometers and rotational rate using one or more gyroscopes. In one embodiment, the auxiliary sensor can be a global positioning system (GPS) receiver, which provides the autonomous mobile unit's geolocation at a given time. In one embodiment, the mobile unit can have an IMU and a GPS receiver as its two auxiliary sensors. As used herein, the term "quadocular-auxiliary sensor" will be used to describe any multi-ocular sensors that include one or more auxiliary sensors.

The cameras or the imaging sensors in the multi-ocular system can be RGB or grayscale. Using low-end imaging sensors to construct a sensor, e.g., cameras having a resolution of 640×480, obviates the cost of high-end image sensors. Wider field of view can be achieved by ultra wide-angle fisheye lenses that produce strong visual distortion intended to create a wide panoramic or hemispherical image.

Autonomous units such as autonomous vehicles, delivery robots and telepresence robot (moving around a remote environment automatically) can benefit from fast, accurate and reliable positional awareness. For example, for an autonomous unit to follow a road, it needs to know its location on the road, where it has been previously and where it is planning on going. For the autonomous vehicle to stay in a particular lane, it needs to know the location of the lane markers. When an obstacle is detected in the planned path, the planned route needs to be modified by the autonomous unit to avoid the obstacle and continue its way to its destination. In general, highways tend to be more predictable and orderly, with road surfaces typically well maintained and lanes well-marked. In contrast, residential or urban driving environments feature a much higher degree of unpredictability with many generic objects, inconsistent lane markings, and elaborate traffic flow patterns. For an autonomous unit to stay in a lane, the localization requirements are in the order of decimeters.

The multi-layer map described herein is a three-dimensional (3D) map used for navigation. In one implementation, a multi-layer map is created having accuracy in a range of 5 centimeter to 10 centimeter. A further implementation provides a multi-layer map having an accuracy in a range of up to 5 cm. A still further implementation provides a multi-layer map having an accuracy of up to 10 cm. One measurement of accuracy is a difference between a location of an object depiction on the multi-layer map and an actual location for the object in space. Embodiments of the present invention provide improved methods for mapping in autonomous units, allowing rich, dynamic information to be downloaded rapidly and efficiently from a map server. In one implementation, the multi-layer maps are stored on the server and are available to be downloaded by various autonomous units. In one implementation, the multi-layer map is constructed at a map server with visual, inertial and geolocation data provided by one or more autonomous units. In another implementation, multi-layer maps are built by autonomous units with quadocular-auxiliary sensors and then stored at a map server. In another implementation, autonomous units with quadocular-auxiliary sensors and the map server share the workload of building the multi-layer map. Implementations can provide improved map generation. Some implementations can provide generating maps with better accuracy. Some implementations can provide improved guidance of electro-mechanical systems.

The layers in the multi-layer map are arranged in a hierarchy, wherein each layer corresponds to a different level or type of feature in the 3D multi-layer map. In one implementation, the multi-layer map has four distinct layers:

(i) Proto-Roadmap: The proto-roadmap layer consists of an existing digital map used for navigation in autonomous and non-autonomous vehicles and is distributed to the autonomous units by the map server. Digital maps usually contain accurate representations of a particular area, detailing major and minor road arteries, points of interests and service locations. Some existing digital maps may have sub-meter level accuracy. Some existing digital maps may have lane-level accuracy. As used herein, the term "sub-meter level accuracy" will be used to describe accuracy within one meter. The technology disclosed can be implemented in the context of any digital map like Google Maps™, MapQuest™, Bing Maps™, Rand McNally™, Here™, Waze™, OpenStreetMap™, Navmii™, Sygic™, Scout™, MAPS.ME™ or CoPilot™.

(ii) Ground perspective view: The ground perspective view layer is created on top of the proto-roadmap layer and contains information regarding the road markings, e.g. broken white lines, solid white lines, double yellow solid lines, broken yellow lines, edge lines, HOV lanes, freeway entrances and exits, pedestrian crosswalks, stop lines, roundabouts, signalized intersections, speed humps, bike only lanes, rail crossings, and yield lines. In one implementation, the ground perspective view has an accuracy in a range of 5 centimeter to 10 centimeter. A further implementation provides an accuracy in a range of up to 5 cm. A still further implementation provides an accuracy of up to 10 cm.

(iii) Spatial perspective view: The spatial perspective view layer is created on top of the ground perspective view layer and contains information regarding various 3D objects or obstacles located in the area. In one implementation, the object can be moving or non-moving. Examples of non-moving objects include traffic light signals, sidewalks, traffic signs, benches, buildings, fire hydrants, etc. Examples of moving objects include other vehicles, pedestrians, motorbikes, bicycles, trains, etc. In one implementation, the spatial perspective view has an accuracy in a range of 5 centimeter to 10 centimeter. A further implementation provides an accuracy in a range of up to 5 cm. A still further implementation provides an accuracy of up to 10 cm.

(iv) Semantic perspective view: The semantic perspective view layer is created on top of the ground and spatial perspective layers and contains semantic information about the road markings from the ground perspective layer and non-moving and moving objects from the spatial perspective layer. In one implementation, the semantic information can be given as a probability, e.g., an object with 74% probability being a train. The semantic information is used to classify the objects in spatial perspective view as moving or non-moving. Only non-moving objects are included in the final multi-layer map.

In one implementation, the proto-roadmap layer may be unavailable in the map server and can be created by the autonomous units. In one implementation, the map server or the autonomous units may not have enough visual information to build the ground perspective view layer and will rely on the proto-roadmap layer for navigation. In one implementation, the map server or the autonomous units may not have enough visual information to build the spatial perspective view layer and will rely on the ground perspective view layer for navigation. In one implementation, the map server or the autonomous units may not have enough semantic information to identify one or more objects in the spatial perspective view layer or one or more road markings in the ground perspective view layer, and thereby, not include the unidentified object or road marking in the final multi-layer map. The multi-map may store a time of day or weather with the multi-layer map.

The multi-layer can be available in one of the following data formats: Extended Markup Language (XML), AutoCAD™ DXF, Cartesian coordinate system (XYZ), Digital line graph (DLG), Esri™ TIN, Geography Markup Language (GML), GeoJSON, GeoMedia, Keyhole Markup Language (KML), Mapinfo™ TAB, National Transfer Format (NTF), Spatialite, Shapefile, Simple Features, SOSI, Spatial Data File, and Topologically Integrated Geographic Encoding and Referencing Vector Product Format (TIGER VPF). Those of ordinary skill in the art will recognize a variety of equivalent variations.

Examples of systems, apparatus, and methods according to the disclosed implementations are described in an autonomous vehicle context. The technology disclosed relates to improving utilization of computing resources such as computational power and memory use during processing of image and data from auxiliary sensors inside a single input-multiple data (SIMD) architecture. The technology disclosed can be implemented in the context of any computer-implemented system including a reduced instruction set (RISC) system, emulated hardware environment, or the like. Moreover, this technology can be implemented using two or more separate and distinct computer-implemented systems that cooperate and communicate with one another. This technology can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein. The technology disclosed can be implemented in the context of any computer-implemented system like a NEON ARM VFP9-S processor, an ARM core processor, or a compatible processor implementation.

System Architecture for Multi-Layer Mapping and Storage

FIG. 1 shows an architectural level schematic of a system 100 in accordance with an implementation. Because FIG. 1 is an architectural diagram, certain details are intentionally omitted to improve the clarity of the description. The discussion of FIG. 1 will be organized as follows. First, the elements of the figure will be described, followed by their interconnections.

The system 100 includes an autonomous vehicle 105 with a quadocular-auxiliary sensor 110, an autonomous vehicle 106 with a quadocular-auxiliary sensor 112, an autonomous vehicle 108 with a quadocular-auxiliary sensor 114, a delivery robot 116 with a quadocular-auxiliary sensor 120, a delivery robot 118 with a quadocular-auxiliary sensor 122, the network(s) 104, and a map hosting server system 102. For clarity sake, only three autonomous vehicles and two delivery robots are shown to be connected to the map hosting server system 102 through the network(s) 104. However, any number of autonomous units with quadocular-auxiliary sensors can be connected to the map hosting server system 102 through the network(s) 104.

The interconnection of the elements of system 100 will now be described. Network(s) 104 couples the autonomous vehicles 105, 106, 108, delivery robots 116, 118, and the map hosting server system 102, all in communication with each other (indicated by solid double-arrowed lines). The actual communication path can be point-to-point over public and/or private networks. The communications can occur over a variety of networks, e.g., private networks, VPN, MPLS circuit, or Internet, and can use appropriate application programming interfaces (APIs) and data interchange formats, e.g., Representational State Transfer (REST), JavaScript™ Object Notation (JSON), Extensible Markup Language (XML), Simple Object Access Protocol (SOAP), Java™ Message Service (JMS), and/or Java Platform Module System. All of the communications can be encrypted. The communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, and WiMAX. Additionally, a variety of authorization and authentication techniques, such as username/password, Open Authorization (OAuth), Kerberos, SecureID, digital certificates and more, can be used to secure the communications.

System Overview of Quadocular-Auxiliary Sensors

Quadocular-Auxiliary Sensor

Figure 2:
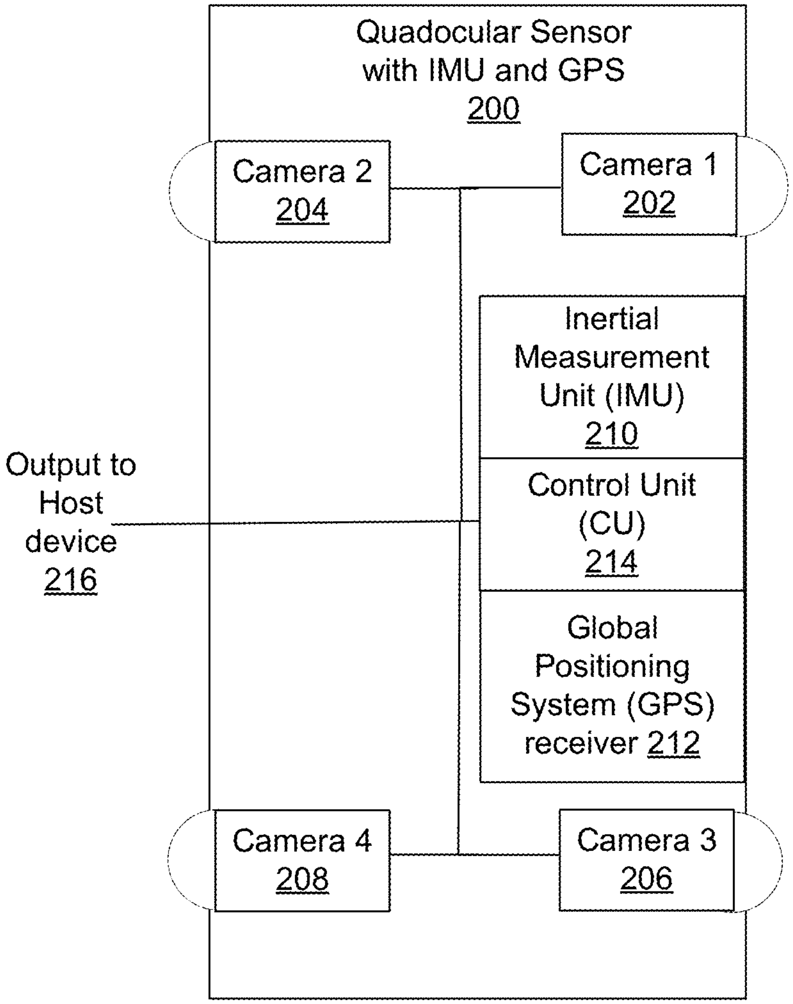
FIG. 2 illustrates an example of a quadocular-auxiliary sensor where an inertial measurement unit and a global positioning system are used as auxiliary sensors.

FIG. 2 illustrates an example of a quadocular-auxiliary sensor 200 for determining positional information where the auxiliary sensors are an IMU and a GPS receiver. The quadocular-auxiliary sensor 200 includes four cameras. The four cameras are configured into two back-to-back pairs (camera 1 202 and camera 2 204, camera 3 206 and camera 4 208) and each pair of cameras is placed horizontally with respect to the other. The two front facing cameras, camera 1 202 and camera 3 206, are used to obtain two differing stereoscopic views on a scene in front of the autonomous mobile unit. Likewise, the two back facing cameras, camera 2 204 and camera 4 208, are used to obtain two differing stereoscopic views on a scene at the back of the autonomous mobile unit. The quadocular-auxiliary sensor 200 further includes an IMU 210, a GPS receiver 212, and a control unit 214. The control unit 214 has a USB interface (not shown in FIG. 2 for clarity sake) to provide output to a host 216. Images from cameras 202, 204, 206, 208 are used for agent localization that extracts features from images and to provide raw information for deep learning based tasks, including object recognition, object tracking, image captioning, and the like.

An IMU 210 provides raw sensor data for agent localization pipeline, which consumes IMU data at a high frequency at least 200 Hz to generate agent positional information in real-time. In an implementation, the localization pipeline combines information from IMU 210 which runs at relatively high frequency to provide frequent updates of less accurate information, and cameras 202, 204, 206, 208 which run at a relatively lower frequency, e.g., 30 Hz in one implementation, to provide more accurate information with less frequency.

A GPS provider 212 provides a global position estimate at e.g., 10 Hz in one implementation. While GPS is a relatively accurate localization sensor, its update rate may be too slow to provide real-time updates. IMU 210 provides a faster update with less accurate results. The IMU 210 propagates the autonomous mobile unit's position periodically, such as for example every 5 milliseconds in one implementation, but the error accumulates as time progresses. Therefore, in one implementation, every 100 milliseconds, a GPS update is received which helps correct the IMU error. Data from the GPS receiver implementations has an accuracy of about one meter. Furthermore, the GPS signal can experience multipath problems, meaning that the signal may bounce off buildings and introduce more noise. A GPS receiver also benefits from an unobstructed view of the sky and thus is less effective in closed environments.

The control unit 214 controls the sensors (IMU 210, GPS receiver 212 and cameras 202, 204, 206, 208), performs pre-computation in order to accelerate the localization pipeline, and packages raw data 216 to be sent to a host.

The control unit 214 enables the quadocular-auxiliary sensor 200 to interact with a host. The host (not shown in FIG. 2 for clarity sake) can be a mobile device or a desktop/laptop computer, specialized machine controller, automobile control module, robot controller or the like, that consumes the data generated by the quadocular-auxiliary sensor 200. In various implementations, the host can perform additional computations to achieve agent localization and deep learning tasks. Implementations that perform data pre-processing on low-power control unit 214 relieve the host processor (which has a much higher power consumption compared to low-power CU) from performing these tasks. As a result, such implementations achieve increased energy efficiency.

Control Unit

Figure 3:
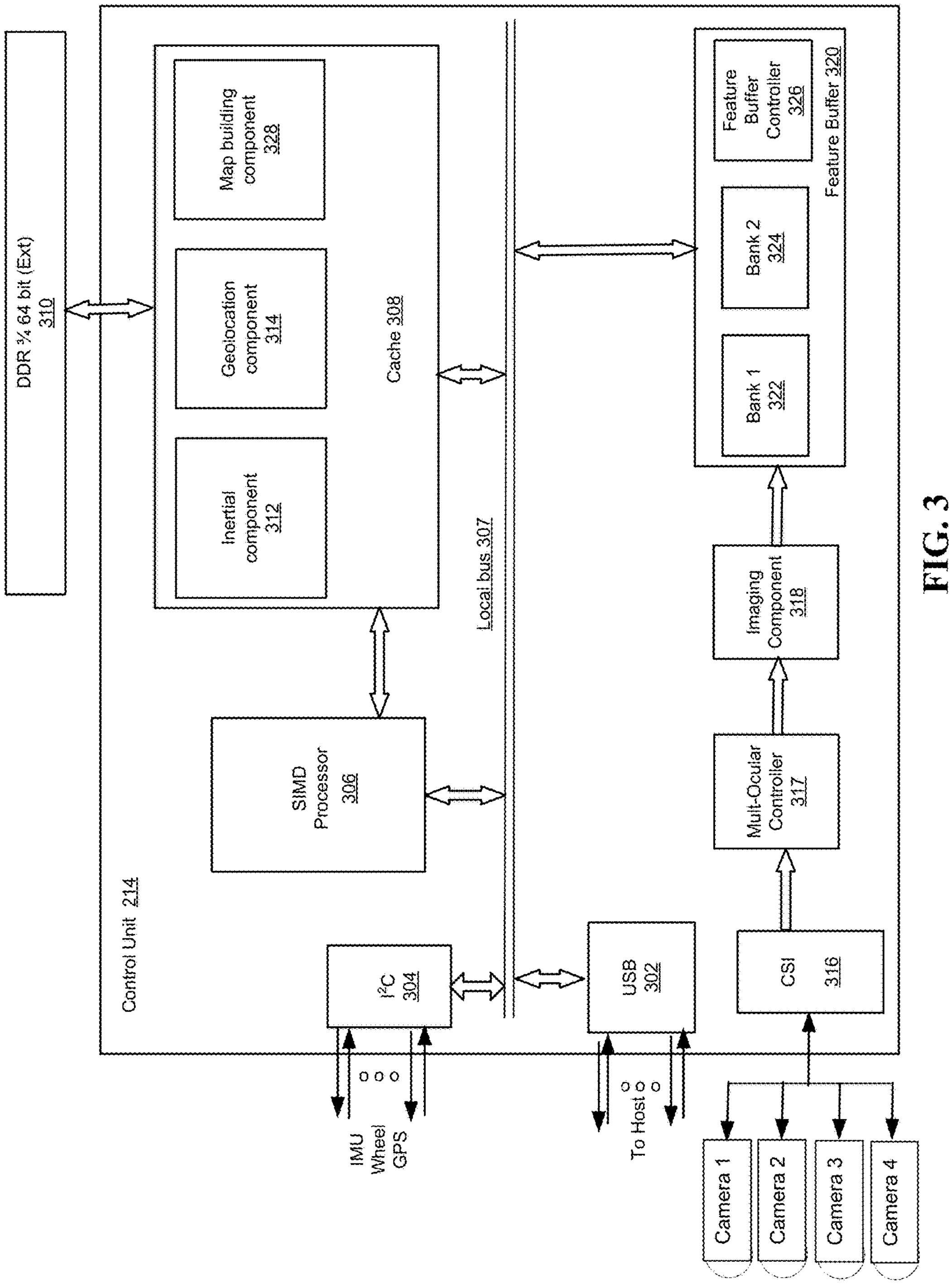
FIG. 3 illustrates an example of a control unit for a multi-ocular-auxiliary sensor.

FIG. 3 illustrates an example of a control unit 214 for a quadocular-auxiliary sensor in block diagram format. control unit 214 in FIG. 3 can be coupled to an external memory 310, a flash memory (not shown in FIG. 3 for clarity sake), and one or more persistent storages such as HDDs, optical drives or the like (also not shown in FIG. 3 for clarity sake). Control unit 214 includes a memory cache 308, a USB I/O port 302, a Camera Serial Interface (CSI) I/O port 316 that facilitates directly receiving images from four cameras, a multi-ocular controller 317, an imaging component 318, an Inter-Integrated Circuit ($I^2C$) I/O ports 304, a single instruction multiple-data (SIMD) capable processor 306, and a feature buffer 320. The components in the control unit 214 are intercoupled by a local bus 307. In an embodiment, the external memory 310 is a 64-bit double data rate (DDR) random access memory (RAM). In an embodiment, the SIMD capable processor 306 is implemented as a reduced instruction set computer (RISC) architecture. In an embodiment, the SIMD capable processor 306 is implemented as a NEON ARM VFP9-S. An inertial component 312 and a geolocation component 314 reside within the memory cache 308. In other embodiments, more than one camera can be connected to the control unit 214 through the Camera Serial Interface (CSI) I/O port 316. In one implementation, multi-layer maps are built by autonomous units with quadocular-auxiliary sensors. In such implementations, the memory cache 308 of the control unit 214 further includes a map building component 328.

Figure 4:
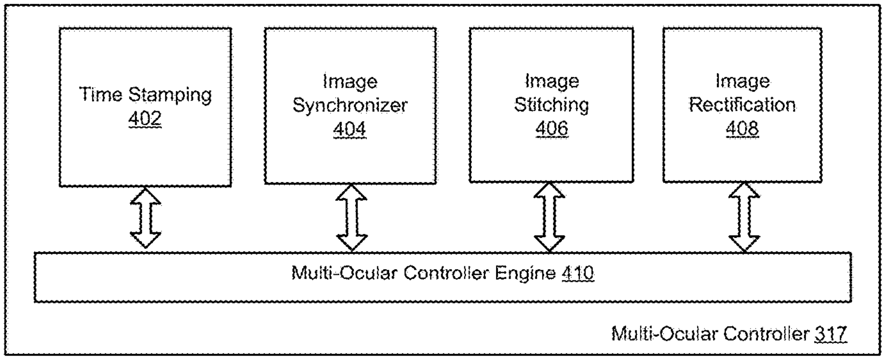
FIG. 4 illustrates an example of a multi-ocular controller in FIG. 3.

FIG. 4 illustrates an example of a multi-ocular controller 317 in FIG. 3. The multi-ocular controller 317 includes a multi-ocular controller engine 410 that implements a time stamping processor 402, an image synchronizer processor 404, an image stitching processor 406, and an image rectification processor 408. The image synchronizer processor 404 sends a synchronization signal to the cameras connected through the CSI I/O port 316 to acquire images in time frames relative to one another from the cameras. The time stamping processor 402 creates time stamps for the images captured by the cameras, thereby maintaining a set of synchronized images in which images captured are tagged with a current timestamp. In one embodiment, the time stamping processor 402 may have its time block. In another embodiment, the time stamping processor 402 may synch with the global real-time clock in the control unit 214. In one embodiment, the image stitching processor 406 combines the synchronized, time-stamped images with overlapping fields of view to produce a seamless 360-degrees view. In another embodiment, the image rectification processor 408 determines a rectification transformation of each synchronized, time-stamped image plane such that pairs of conjugate epipolar lines become collinear and parallel to one of the image axes. Therefore, the images with overlapping fields of view are rectified to a common image plane, resulting in a 360-degrees view. The multi-ocular controller 317 can be implemented as a field programmable gate array (FPGA).

Referring to FIG. 3, the stitched or rectified image from the multi-ocular controller 317 is directly processed by the imaging component 318 to extract useful corner features and generates a descriptor for each feature. The imaging component 318 can be implemented as a Digital Signal Processor (DSP). The imaging component 318 directly processes the incoming images without involving the SIMD processor 306 or storing the image data in the cache 308.

Figure 5:
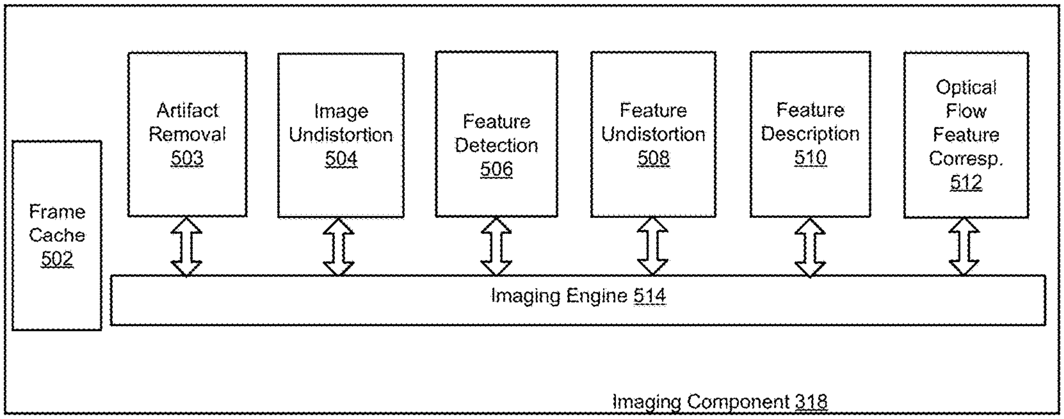
FIG. 5 illustrates an example of an imaging component in FIG. 3.

FIG. 5 illustrates an example of an imaging component 318 in FIG. 3. An Imaging component 318 includes a direct memory access (DMA) 502, an artifact removal processor 503, an image undistortion processor 504, a feature detection engine 506, a feature undistortion processor 508, a feature description processor 510, and an optical flow feature correspondence processor 512 under control of an Imaging Engine 514.

Dust, dirt or scratches on the camera lenses of the quadocular-auxiliary sensor block incoming light before it reaches the visual sensors, and appears as dark spots in images. The presence of these artifacts will result in an image different than the scene in front of the cameras, and affect detection of key features. Image correction of artifacts by artifact removal processor 503 can be used to recreate missing pixel data. Various algorithms used for image correction by artifact removal processor 503 will be readily apparent to those skilled in the art.

The image undistortion processor 504 corrects distortion in the image data in the captured frames. The image distortion is generally referred to an optical aberration that deforms and bends physically straight lines and makes them appear curvy in images. Optical distortion occurs as a result of optical design. To achieve reliable computer vision results, image undistortion processor 504 can undistort the image before further processing is performed. This can be achieved by using a lookup table of the size of the input image and performing a remapping operation to undistort the whole image.

In cases when the remaining portions of the processing pipeline do not require the whole image, but only the feature points within the image, the feature undistortion processor 508 perform a feature undistortion operation on the CU. In detail, this operation runs after the feature extraction stage and undistorts each feature point.

The processor feature detection engine 506 performs feature detection upon image frames using Shi-Tomasi. Features are "interesting" parts of an image. The Shi-Tomasi feature detection includes methods that aim at computing abstractions of image information and making local decisions at every image point whether there is an image feature of a given type at that point or not. The resulting features will be subsets of the image domain, often in the form of isolated points. Some implementations perform the feature detection on the control unit 214 to relieve the host from performing such tasks, and to accelerate the feature detection process. A type of feature can be (A) two small Eigen values: the feature is not interesting; (B) one small, one big value: the feature is likely an edge; (C) two big values: the feature is likely a corner; and (D) other type of features. Accordingly, in an implementation, processing includes: (a) action 1: calculate Eigen value of the intensity value of each pixel and its surrounding pixels, and determine (i) whether the feature is of interest; and (ii) for features of interest, a type of feature; and (b) action 2: refine by applying non-maximum suppression, applying spatial binning, applying heuristics or applying other types of refinement.

The feature description engine 510 performs feature description on detected features. The feature description includes methods to identify each detected points in an image uniquely. Feature description can be used to compare and match feature points between different images. Some implementations perform the feature description on the control unit 214 to relieve the host from performing such tasks, and to accelerate the feature description process.

One implementation of feature description engine 510 uses a SIMD-accelerated ORB descriptor to describe features. The description of a feature can be used for matching purposes and describe a feature's uniqueness. The ORB descriptor approach was selected for its relative rotational invariance and immunity to Gaussian image noise. One example of an ORB feature detector and binary descriptor can be found at "ORB feature detector and binary descriptor," http://scikit-image.org/docs/dev/auto examples/plot_orb.html (last accessed Aug. 17, 2016). For further information on ORB Descriptor, reference may be had to Ethan Rublee, et al., "ORB: an efficient alternative to SIFT or SURF," which is incorporated herein by reference for all purposes.

In some implementations, the feature detection engine 506 and the feature description engine 510 can be combined, as demonstrated in Convolutional Neural Networks (CNNs). A convolution neural network is a type of deep neural network that is widely used in object recognition tasks. A general CNN evaluation pipeline usually consists of the following layers: (i) the convolution layer uses different filters to extract different features from the input image with each filter containing a set of "learnable" parameters that will be derived after the training stage; (ii) the activation layer decides whether to activate the target neuron or not; (iii) the pooling layer reduces the spatial size of the representation to reduce the number of parameters and consequently the computation in the network; and (iv) the fully connected layer connects all neurons to all activations in the previous layer. CNNs have proven very useful in areas such as feature recognition and classification in images from visual sensors. CNNs have managed to identify faces, objects and traffic signs for autonomous robots and vehicles. CNNs are data centric and require heavy computation. In the last few years, increases in available storage and computation capabilities have enabled CNNs to achieve success in supervised perception tasks of key features in images from visual sensors. After training for days or even weeks on a large data set, a CNN can be capable of in real-time perception of key features in images. For example, CNNs have achieved top results with ImageNet Large Scale Visual Recognition Challenge (ILSVRC) dataset, which contains 1-2 million images in over 1000 categories.

In autonomous vehicles, CNNs can be used to perform lane and vehicle detection while running at frame rates required for a real-time system. A labeled data set is required to represent all possible driving environments (rain, snow, night, day, etc.), and scenarios (pedestrian crossing the road, a car in front, mailbox by the side of the road, etc.). Various versions of CNNs can be used to implement the technology disclosed herein, e.g., AlexNet, Overfeat CNN, R-CNN, etc.

The optical flow feature correspondence processor 512 performs 2D feature correspondence generation for the features. The feature correspondence computation is used to identify the feature points that appear on both the left and the right cameras. Once feature correspondence is identified for any two feature points, triangulation can be applied to the feature points to derive the depth of the point in space. This depth information is employed by processes later in the localization pipeline. Some implementations perform the feature correspondence generation on the control unit 214 to relieve the host from performing such tasks, and to accelerate the feature correspondence generation.

One optical flow feature correspondence processor 512 implementation employs optical flow methods to calculate the motion between two image frames, taken at times t and t+Δt at each voxel position. One such method, called a differential method, is based on local Taylor series approximations of the image signal, using partial derivatives concerning the spatial and temporal coordinates. Accordingly, in an implementation, processing includes: (a) input: last image, current image, a list of detected feature locations from the last image; (b) output: a list of locations of the last image's detected features' in the current image; (c) assumption: brightness consistency, image changes by and only by motion; (d) action 1: predict the output locations by either just assuming there is no motion, so the current locations are the same as last frame's feature locations, OR use information retrieved from the auxiliary sensors to predict the locations; and (e) action 2: refine the pixel coordinate for each feature point by searching around the predicted location, matching patches, and using matching score to determine the refined position. Accordingly, the technology disclosed can provide implementations with the ability to gain increased performance by using information from the auxiliary to narrow the search and save time.

Figure 6:
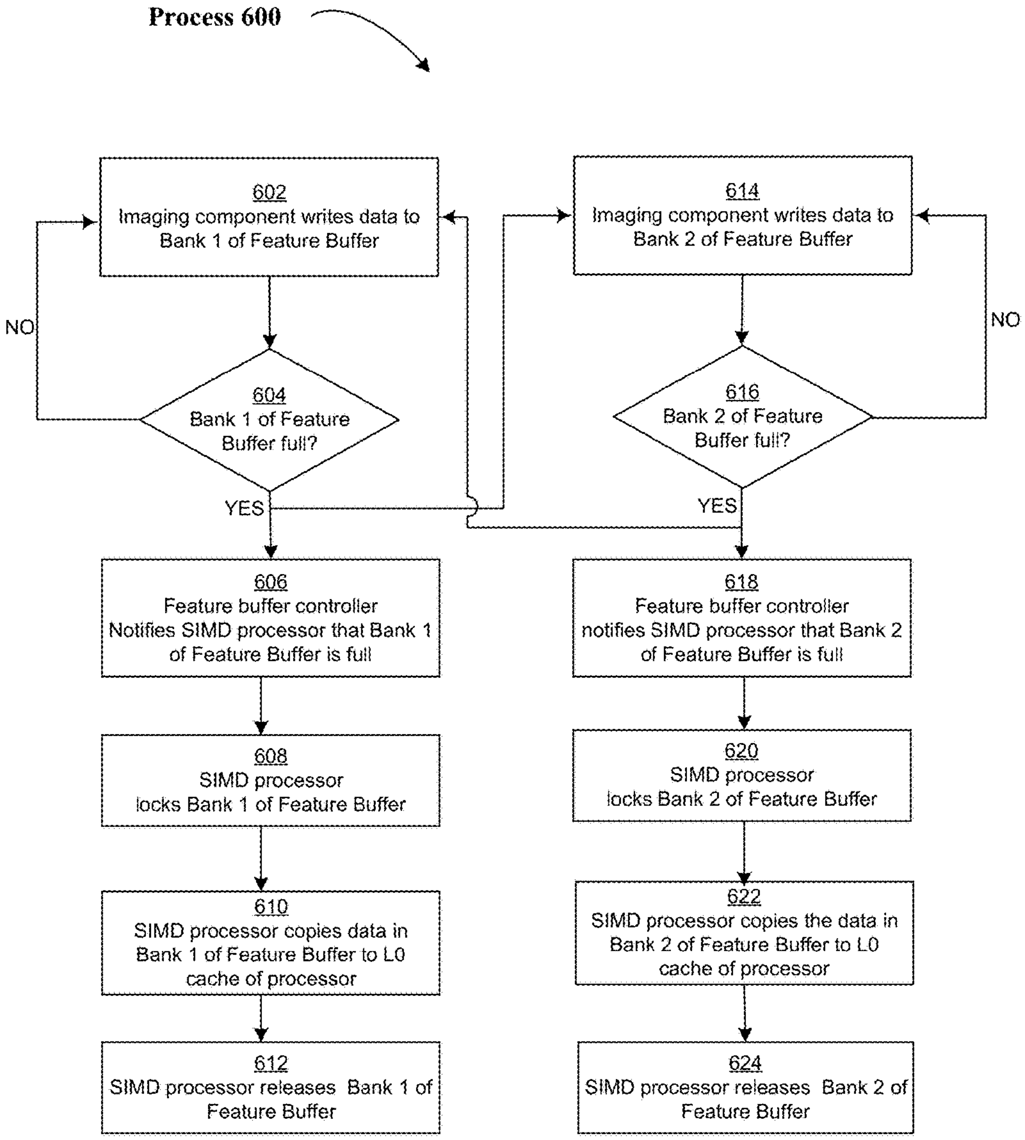
FIG. 6 illustrates a method of operation of the feature buffer in FIG. 3.

Referring again to FIG. 3, after the incoming images are analyzed, and key features are extracted by the imaging component 318, a feature buffer 320 stores the extracted features. The feature buffer 320 comprises of bank 1 322, bank 2 324 and a feature buffer controller 326. FIG. 6 illustrates a method of operation 600 of the feature buffer 320. The imaging component 318 can write data to either bank 1 (action 602) or bank 2 (action 614), but not concurrently. If the imaging component 318 is currently writing data to bank 1 and bank 1 becomes full (action 604), the feature buffer controller 326 notifies the SIMD processor 306 (action 606) that bank 1 is full. Meanwhile, the imaging component 318 starts writing data to bank 2 (action 614). The SIMD processor 306 locks bank 1 (action 608), copies the data in bank 1 to the L0 cache available inside the SIMD processor (action 610), and releases bank 1(action 612). If bank 2 becomes full (action 616), the feature buffer controller 326 notifies the SIMD processor 306 about the filled bank 2 (action 618), and the imaging component 318 starts writing data to bank 1 (action 602). The SIMD processor 306 locks bank 2 (action 620), copies the data in bank 2 to the L0 cache available inside the SIMD processor (action 622), and releases bank 2 (action 624). Of course, other implementations in which additional banks are employed will be readily apparent to those skilled in the art.

Figure 7:
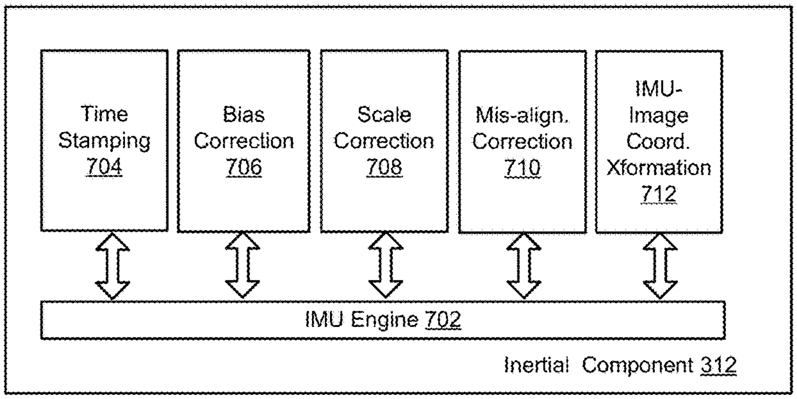
FIG. 7 illustrates an example of an inertial component in FIG. 3.

FIG. 7 illustrates an example of an inertial component 312 in FIG. 3. The Inertial component 312 includes an Inertial Measurement engine 702 that implements a time stamping processor 704 that time stamps sets of inertial data from an inertial sensor (not shown in FIG. 1 for clarity sake), a bias correction processor 706 that corrects data read out from the time-stamped inertial data, a scale correction processor 708 that applies stored scale factor information to the corrected inertial data, a misalignment correction processor 710 that corrects misalignments of sensory elements of the inertial measurement sensor, and an IMU-Image coordinate transformation processor 712 that computes transformations describing differences between a frame of reference of the inertial data and a frame of reference of the image data.

The time stamping processor 704 of an inertial component 312 time stamps each set of inertial measurement data that the control unit 214 receives from the IMU sensor 210 data, in order to assure that the quadocular-auxiliary sensor 200 maintains a temporally accurate stream of sensor data. Such rigorous attention to maintaining the integrity of the sensor data stream enables implementations to provide agent localization that works reliably. Time-stamping raw data by the quadocular-auxiliary sensor obviates the need for complex synchronization tasks.

The bias correction processor 706 corrects IMU data read out from the time-stamped inertial data. Due to manufacturing imperfections, IMU sensors usually have bias problems such that its measurements contain errors. A bias error, if not removed from the measurement, is integrated twice as part of the mechanization process. In this case, a constant bias (error) in acceleration becomes a linear error in velocity and a quadratic error in position. A constant bias in attitude rate (gyro) becomes a quadratic error in velocity and a cubic error in position. The bias can be derived from the offline factory sensor calibration stage. This calibration information in control unit 214 to perform bias correction task on control unit 214.

The scale correction processor 708 applies stored scale factor information to the corrected inertial data. Scale factor error is the relation between input and output. If the input is 100%, the expected output is 100%. The actual output is the result of a linear effect, where the output is proportional to the input but scaled. For example, if the input is 10 $m/s^2$, but there is a 2% scale factor error, the output measurement is 10.2 $m/s^2$. The scale factor can be derived from the offline factory sensor calibration stage. This calibration information in control unit 214 to perform scale correction task on control unit 214.

The misalignment correction processor 710 corrects misalignments of sensory elements of the inertial measurement sensor. There is a 3-axis gyroscope, and a 3-axis accelerometer mounted orthogonally to each other. The mountings, however, have errors and so are not perfectly at 90 degrees. This leads to a correlation between sensors. For example, in one configuration, one axis is pointed perfectly up, and the IMU is level. The accelerometer on this axis measures gravity. If the other two axes were perfectly orthogonal, they do not measure any of the effects of gravity. If there is a non-orthogonality, the other axes also measure gravity, leading to a correlation in the measurements. The effect of non-orthogonality occurs within sensor sets (between accelerometers or gyroscopes), between sensor sets or between the sensor sets and the enclosure (package misalignment). Careful manufacturing, as well as factory calibration, can help minimize this error source. Continuous estimation and correction during system operation is also an approach used to minimize this effect. Package misalignment (between the IMU 210 and the enclosure) can be removed by performing a bore-sighting estimation to determine the offset between the IMU 210 measurement frame and the sensor (objective) frame. The misalignment numbers can be derived from the offline factory sensor calibration stage. This calibration information in control unit 214 to perform misalignment correction task on control unit 214.

Figure 8:
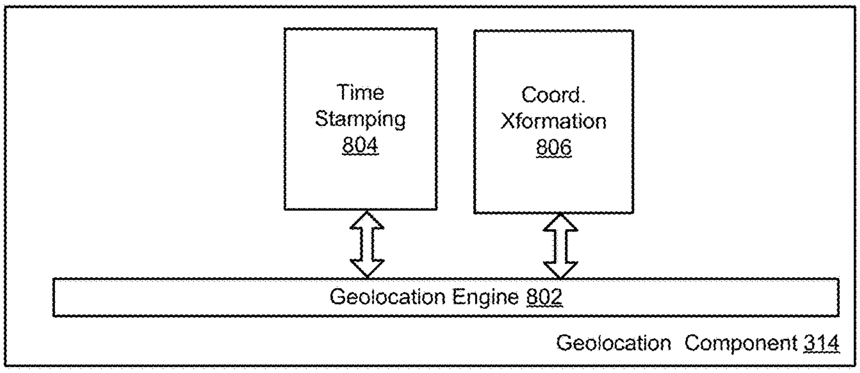
FIG. 8 illustrates an example of a geolocation component in FIG. 3.
Figure 9:
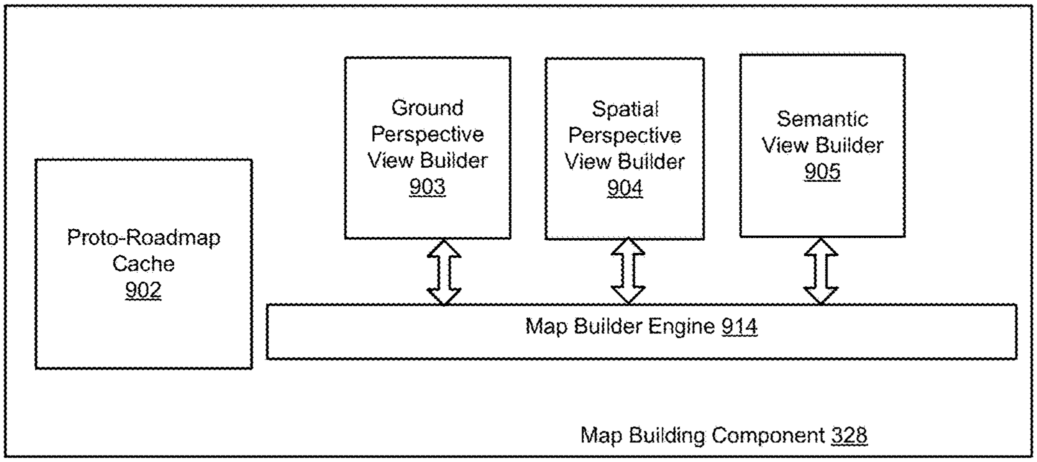
FIG. 9 illustrates an example of a map building component in FIG. 3.

In some implementations, the IMU 210 and the cameras 202, 204, 206 and 208 do not reside at the same physical location; there is a distance between the IMU 210 and the cameras 202, 204, 206 and 208. Accordingly, in order to enable later processes in the localization pipeline to treat the IMU 210 and the cameras 202, 204, 206 and 208 as being co-located, on implementation determines a transformation matrix between the IMU 210 and the cameras 202, 204, 206 and 208, which can be achieved from an offline production or post-production calibration stage. In control unit 214, this transformation matrix is stored locally and applied to the IMU data. This technique enables later processes to be able to treat the IMU 210 and the cameras 202, 204, 206 and 208 to be co-located FIG. 8 illustrates an example of a geolocation component 314 in FIG. 3. The geolocation component 314 includes a geolocation engine 802 that implements a time stamping processor 804 that time stamps sets of geolocation data from the autonomous mobile unit's GPS receiver (not shown in FIG. 3 for clarity sake), and a coordinate transformation processor 806 that computes transformations. The GPS receiver may receive geolocation of the autonomous mobile unit in North-East down (NED) coordinate format or Earth-Centered, Earth-Fixed (ECEF) format. The coordinate transformation processor 806 has the capability of translating any one of the geolocation coordinate formats of the GPS receiver to the one used by the autonomous mobile unit and vice versa.

In an embodiment, multi-layer maps for navigation are built on the control unit 214. FIG. 7 illustrates an example of a map building component 328 in FIG. 3 for implementations in which the multi-layer maps are built by the autonomous units. The map building component 328 includes a direct memory access (DMA) 902 which may store proto-roadmaps received from a map server, a ground perspective view builder 903, a spatial perspective view builder 904 and a semantic perspective view builder 905 under control of a map builder engine 914.

The ground perspective view builder 903 builds the ground perspective view layer on top of the proto-roadmap layer in the multi-layer map with the help of the feature detection engine 506. The ground perspective view builder 903 adds information regarding the road markings, e.g., broken white lines, solid white lines, double yellow solid lines, broken yellow lines, edge lines, HOV lanes, freeway entrances and exits, pedestrian crosswalks, stop lines, roundabouts, signalized intersections, speed humps, bike only lanes, rail crossings, and yield lines.

The spatial perspective view builder 904 builds the spatial perspective view layer on top of the ground perspective view layer in the multi-layer map with the help of the feature detection engine 506. The spatial perspective view builder 904 adds information regarding various objects or obstacles located in the area. In one implementation, the object can be moving or non-moving. Examples of non-moving objects include traffic light signals, sidewalks, traffic signs, benches, buildings, fire hydrants, etc. Examples of moving objects include other vehicles, pedestrians, trains, etc. The spatial perspective view has accuracy at the centimeter level.

The semantic view builder 905 builds the semantic view layer is created on top of the spatial perspective layer with the help of the feature description engine 510 or a combined feature detection engine 506 and feature description engine 510 (Convolutional Neural Networks). The semantic view builder 905 adds semantic information about the road markings from the ground perspective layer and non-moving and moving objects from the spatial perspective layer. The semantic information is used to classify the objects in spatial perspective view as moving or non-moving.

Figure 10:
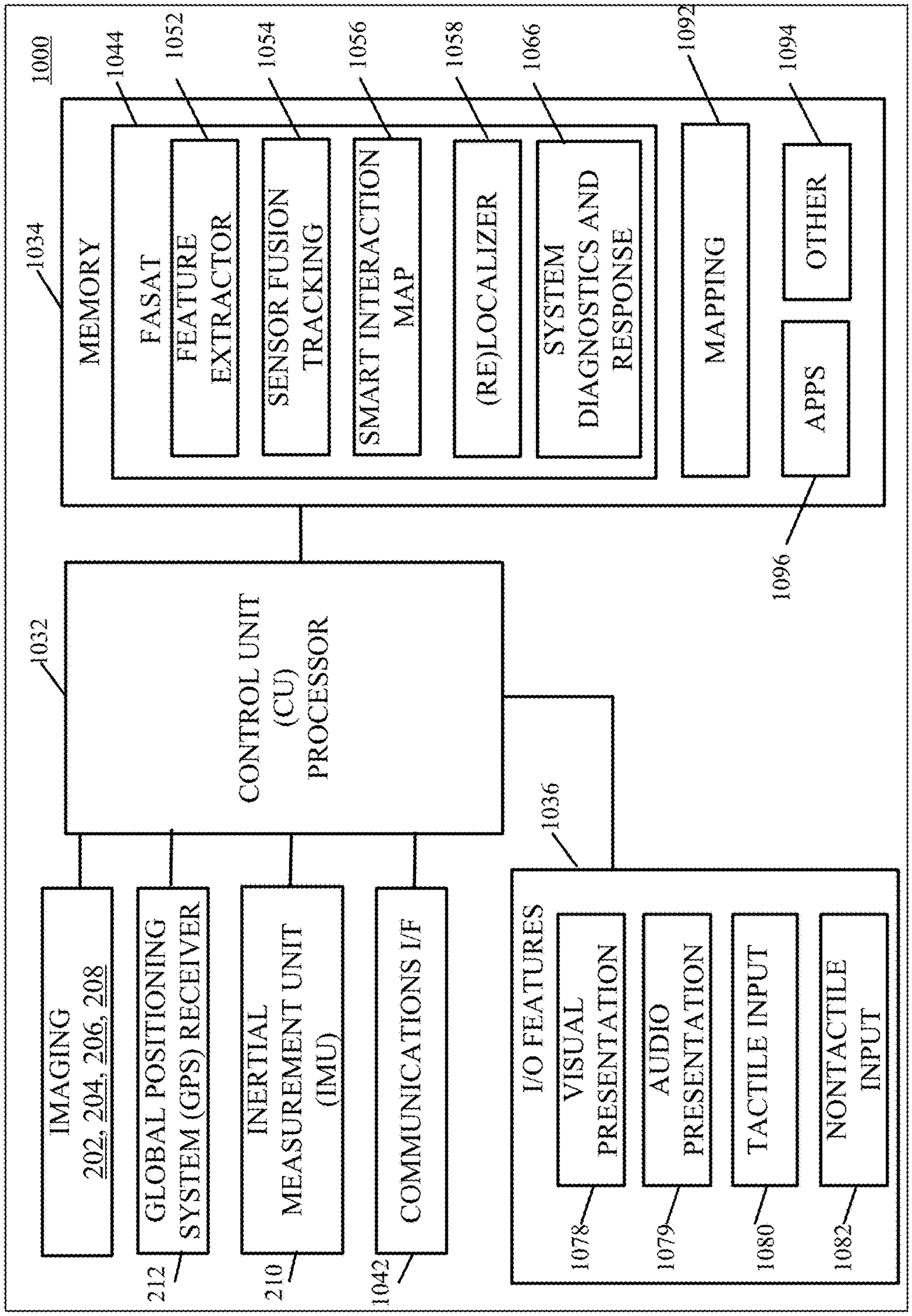
FIG. 10 illustrates an example of a quadocular-auxiliary sensory system.

Referring now to FIG. 10, which shows a simplified block diagram of a quadocular-auxiliary positioning system 1000 which can be used to implement quadocular-auxiliary sensor

1000. Quadocular-auxiliary positioning system 1000 includes a processor 1032, a memory 1034, an IMU 210, a GPS receiver 212, cameras 202, 204, 206 and 208, and a communications interface 1042. One or more additional I/O features 1036 are included to address implementation specific needs, such as a visual presentation interface 1078, an audio presentation interface 1079, sensor(s) for detecting tactile input (e.g., keyboards, keypads, touchpads, mouse, trackball, joystick and the like) 1080, and non-tactile input (e.g., microphone(s), sonar sensors and the like) 1082. Memory 1034 can be used to store instructions to be executed by processor 1032 as well as input and/or output data associated with execution of the instructions. In particular, memory 1034 contains instructions, conceptually illustrated as a group of modules described in greater detail below, that control the operation of processor 1032 and its interaction with the other hardware components. An operating system directs the execution of low-level, basic system functions such as memory allocation, file management, and operation of mass storage devices. The operating system may be or include a variety of operating systems such as Microsoft WINDOWS™ operating system, the Unix™ operating system, the Linux™ operating system, the Xenix™ operating system, the IBM AIX™ operating system, the Hewlett Packard UX™ operating system, the Novell NETWARE™ operating system, the Sun Microsystems SOLARIS™ operating system, the OS/2™ operating system, the BeOS™ operating system, the MACINTOSH™ operating system, the APACHE™ operating system, an OPENACTION™ operating system, iOS™, Android or other mobile operating systems, or another operating system of platform.

The computing environment may also include other removable/non-removable, volatile/nonvolatile computer storage media. For example, a hard disk drive may read or write to non-removable, nonvolatile magnetic media. A magnetic disk drive may read from or write to a removable, nonvolatile magnetic disk, and an optical disk drive may read from or write to a removable, nonvolatile optical disk such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

In an embodiment, the processor 1032 is a NEON ARM processor implementing a single input-multiple data (SIMD) architecture as a reduced instruction set computer (RISC) architecture. Depending on implementation, however, processor 1032 can alternatively be a realized using a specific purpose microcontroller, peripheral integrated circuit element, a CSIC (customer-specific integrated circuit), an ASIC (application-specific integrated circuit), a logic circuit, a digital signal processor, a programmable logic device such as an FPGA (field-programmable gate array), a PLD (programmable logic device), a PLA (programmable logic array), an RFID processor, smart chip, or any other device or arrangement of devices that are capable of implementing the actions of the processes of the technology disclosed.

Communications interface 1042 can include hardware and/or software that enables communication between quadocular-auxiliary positioning system 1000 and other systems controlling or enabling customer hardware and applications (hereinafter, a "host system" or "host") such as for example, a robot or other guided mobile platform, an autonomous vehicle, or the like (not shown in FIG. 10 for clarity sake). Cameras 202, 204, 206 and 208, as well as sensors such as IMU 210, and GPS receiver 212, can be coupled to processor 1032 via a variety of communications interfaces and protocols implemented by hardware and software combinations. Thus, for example, positioning system 1000 can include one or more camera data ports and/or motion detector ports (not shown in FIG. 10 for clarity sake) to which the cameras and motion detectors can be connected (via conventional plugs and jacks), as well as hardware and/or software signal processors to modify data signals received from the cameras and motion detectors (e.g., to reduce noise or reformat data) prior to providing the signals as inputs to a fast accurate stable adaptive tracking ("FASAT") process 1044 executing on processor 1032. In some implementations, quadocular-auxiliary positioning system 1000 can also transmit signals to the cameras and sensors, e.g., to activate or deactivate them, to control camera settings (frame rate, image quality, sensitivity, etc.), to control sensor settings (calibration, sensitivity levels, etc.), or the like. Such signals can be transmitted, e.g., in response to control signals from processor 1032, which may, in turn, be generated in response to user input or other detected events.

Instructions defining FASAT process 1044 are stored in memory 1034, and these instructions, when executed, perform analysis on image frames captured by the cameras 202, 204, 206 and 208, inertial data captured by the IMU 210 and geolocation data from the GPS receiver 212 connected to quadocular-auxiliary positioning system 1000. In one implementation, FASAT process 1044 includes various logical processes, such as a feature extractor 1052 that receives a raw image and determines a salient points' representation of objects in the image thereby representing the geometry understanding of the objects from a machine's perspective view. In some implementations, feature extractor 1052 analyzes images (e.g., image frames captured via cameras 202, 204, 206 and 208) to detect edges of an object therein and/or other information about the object's location. A sensor fusion tracking process 1054 uses feature extraction results, inertial data from the IMU 210 and geolocation data from the GPS receiver 212 to generate pose accurately and rapidly. A smart interaction map 1056 enables using a known map of obstructions to localize the sensor. The map is built using mapping functionality of mapping process 1092, which is described in further detail herein below. A Re-localizer process 1058 recovers device positional awareness when the device has lost track of device position. A system diagnostic and response (SDAR) 1066 manages of current localizing state of the device and provide response strategy.

A mapping process 1092 generates a multi-layer map that maps the surrounding and objects recognized by the feature extractor 1052 in the ground perspective view and spatial perspective view of the multi-layer maps.

In some implementations, other processing 1094 analyzes audio or ultrasonic signals (e.g., audio signals captured via sonar or audio sensors comprising non-tactile input 1082) to localize objects and obstructions by, for example, time distance of arrival, multilateralism or the like ("Multilateration is a navigation technique based on the measurement of the difference in distance to two or more stations at known locations that broadcast signals at known times. See Wikipedia, at <http://en.wikipedia.org/w/index.php?title=Multilateration&oldid=523281858>, on Nov. 16, 2012, 06:07 UTC). Audio signals place the object on a known surface, and the strength and variation of the signals can be used to detect object's presence. If both audio and image information is simultaneously available, both types of information can be analyzed and reconciled to produce a more detailed and/or accurate path analysis.

In some implementations, other processing 1094 determines paths to track and predict device movements in space based upon the multi-layer maps generated by mapping process 1092. One or more applications 1096 can be loaded into memory 1034 (or otherwise made available to processor 1032) to augment or customize functioning of the quadocular sensors thereby enabling the system 1000 to function as a platform. Successive camera images are analyzed at the pixel level to extract object movements and velocities. In some implementations, presentation interface 1078 includes a video feed integrator provides integration of live video feed from the cameras 202, 204, 206 and 208, and one or more virtual objects. Video feed integrator governs the processing of video information from disparate types of cameras. For example, information received from pixels that provide quadochromatic imaging and from pixels that provide color imaging (e.g., RGB) can be separated by the integrator and processed differently. Information from one type of sensor can be used to enhance, correct, and/or corroborate information from another type of sensor. Information from one type of sensor can be favored in some types of situational or environmental conditions (e.g., low light, fog, bright light, and so forth). The device can select between providing presentation output based upon one or the other types of image information, either automatically or by receiving a selection from the user.

Presentation interface 1078, audio presentation 1079, non-tactile input 1082, and communications interface 1042 can be used to facilitate user interaction via a quadocular sensor with quadocular-auxiliary positioning system 1000. These components can be of highly customized design, generally conventional design or combinations thereof as desired to provide any type of user interaction. In some implementations, results of analyzing captured images using inertial measuring unit 210, GPS receiver 212 and cameras 202, 204, 206, 208 and FASAT program 1044 can be interpreted as representing objects and obstacles in 3D space. For example, a robot equipped with quadocular-auxiliary sensor can perform path planning and/or obstacle avoidance across a surface that has been analyzed using FASAT program 1044, and the results of this analysis can be interpreted as an occupancy map by some other program executing on processor 1032 (e.g., a motion planner, localization and tracking process, or other application). Smart interaction map 1056 may use the representation of space built by mapping 1092 to plan a path for a robot or mobile platform through the space, e.g., to improve localization and tracking of the robot or platform through the space.

It will be appreciated that the quadocular-auxiliary positioning system 1000 is illustrative and that variations and modifications are possible. Quadocular-auxiliary positioning systems can be implemented in a variety of form factors, including "cloud" computing systems of servers and networks, desktop systems, laptop systems, tablets, smart phones or personal digital assistants, and so on. A particular implementation may include other functionality not described herein for clarity sake. In some implementations, one or more cameras and two or more microphones may be built into the quadocular-auxiliary system 1000 or may be supplied as separate components. Further, an image or audio analyzer can be implemented using only a subset of a quadocular-auxiliary positioning system 1000 components (e.g., as a processor executing program code, an ASIC, or a fixed function digital signal processor, with suitable I/O interfaces to receive image data and output analysis results).

While quadocular-auxiliary positioning system 1000 is described herein with reference to particular blocks, it is to be understood that the blocks are defined for convenience of description and are not intended to imply a particular physical arrangement of component parts. Further, the blocks need not correspond to physically distinct components. To the extent that physically distinct components are used, connections between components (e.g., for data communication) can be wired and/or wireless as desired. Thus, for example, execution of feature extractor 1052 by processor 1032 can cause processor 1032 to operate IMU 210, GPS receiver 212 and cameras 202, 204, 206, 208 to capture images and/or audio signals of an object traveling across and in contact with a surface to detect its entrance by analyzing the image and/or audio data.

Tracking for Autonomous Units with Quadocular-Auxiliary Sensors

Tracking refers to capabilities rendered by system hardware and functional processes that enable a controlled device (robot, mobile platform, autonomous vehicles, or other hardware) to localize itself and have positional awareness continuously, e.g., the sensor system can determine where it is in the real world.

Architecture for Tracking System

Figure 11:
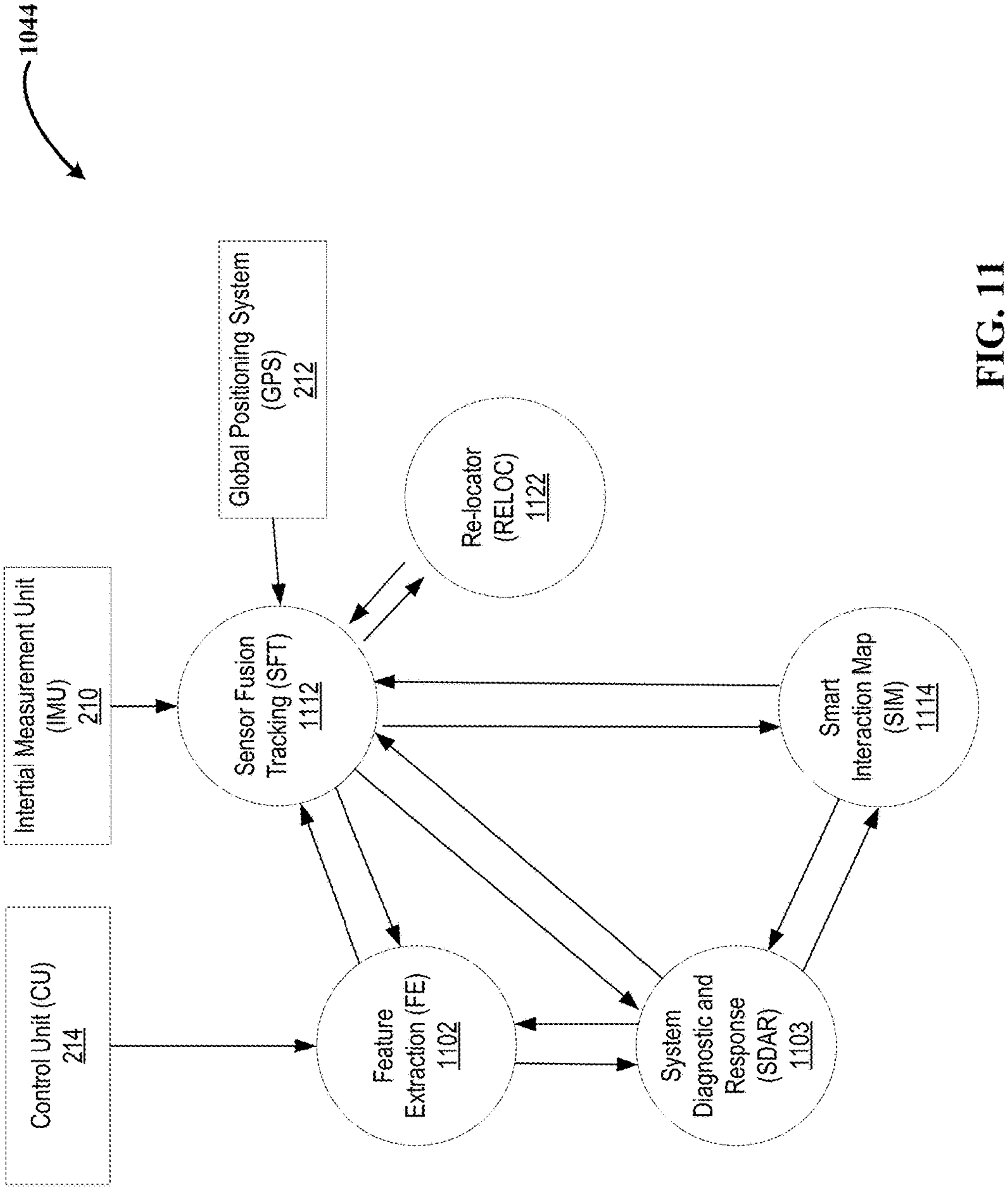
FIG. 11 illustrates an example tracking system implementing the tracking process.

FIG. 11 illustrates example architecture for a tracking system implementation. As shown in FIG. 11, components and information flow between components of an example fast, accurate, stable adaptive tracking ("FASAT") process 1044 of FIG. 10 are illustrated by feature extractor (FE) 1102, sensor fusion based tracker (SFT) 1112, smart interaction with map (SIM) processor 1114, a system diagnostics and response (SDAR) processor 1103 and a Re-locator (RELOC) 1122. The data flow and operation of one example implementation of these components will next be described.

Feature Extraction

A feature extractor (FE) 1102 represents the geometric understanding of an environment from an autonomous mobile unit's perspective view. Feature extractor 1102 receives raw image information from control unit 214 and provides a propagated pose of the autonomous mobile unit to a sensor fusion tracker (SFT) 1112. One implementation of a feature extractor 1102 performs a variety of actions including image preprocessing, feature detection, and feature descriptor preparation. Image processing tasks also include performing artifact removal and Gaussian blur and gamma correction on raw image data.

Feature Detection: Optical Flow

Optical flow gives the 2D-2D correspondence between previous image and a current image. Feature extractor 1102 generates a hierarchy of levels; each level generation is aligned with optical flow needs, and therefore need only be computed once.

Processed images are stored in a multiple hierarchical patch and/or undistorted patch. In an example implementation, as levels in the hierarchy increase, the more blur exists in the image. At each level in the hierarchy, the size of the image is reduced to ¼ of the size of the image from which it is derived, e.g., the size of the image in the previous level. For example, if an image on the first ("zero level") has a size 640×480, then the size of the corresponding image on the next higher level ("first level") has a size 320×240, and a next corresponding image at the next higher level ("second level") has a size 160×120. If the same feature point appears at more than one level, then that feature point is determined by the system to be a strong feature point. In the foregoing example, a scale factor of 2 is used. However, any scale factor can be selected, e.g., a scale factor of 1.6 provides the original 640×480 image with a next level image having a resolution of 400×300.

One feature extractor 1102 implementation employs optical flow methods to calculate the motion between two image frames, taken at times t and t+Δt at each voxel position. One such method, called a differential method, is based on local Taylor series approximations of the image signal, using partial derivatives with respect to the spatial and temporal coordinates. Accordingly, in an implementation, processing includes: (a) input: last image, current image, a list of detected feature locations from the last image; (b) output: a list of locations of the last image's detected features' in the current image; (c) assumption: brightness consistency, image changes by and only by motion; (d) action 1: predict the output locations by either just assuming there is no motion, so the current locations are the same as last frame's feature locations, OR use information retrieved from one or more auxiliary sensors to predict the locations; and (e) action 2: refine the pixel coordinate for each feature point by searching around the predicted location, matching patches, and using a matching score to determine the refined position. Accordingly, the technology disclosed can provide implementations with the ability to gain increased performance by using information from one or more auxiliary sensors to narrow the search and save time.

Feature Detection:

One implementation of feature extraction processor 1102 uses NEON-accelerated Shi-Tomasi feature detection with spatial binning in order to obtain features from regions to cover as much as possible for the full image. The feature extractor 1102 uses data from one or more auxiliary sensors and the pose information received from sensor fusion tracker 1112 in order to dynamically decide the regions to track and the parameters to use. Features are "interesting" parts of an image. A type of feature can be (A) two small Eigen values: the feature is not interesting; (B) one small, one big value: the feature is likely an edge; (C) two big values: the feature is likely a corner; and (D) other type of features. Accordingly, in an implementation, processing includes: (a) action 1: calculate Eigen value of the intensity value of each pixel and its surrounding pixels, and determine (i) whether the feature is of interest; and (ii) for features of interest, a type of feature; and (b) action 2: refine by applying non-maximum suppression, applying spatial binning, applying heuristics or applying other types of refinement.

Feature Descriptor:

One implementation of feature extractor 1102 uses a SIMD-accelerated ORB descriptor to describe features. The description of a feature can be used for matching purposes and describe a feature's uniqueness. The ORB descriptor approach was selected for its relative rotational invariance and immunity to Gaussian image noise. One example of an ORB feature detector and binary descriptor can be found at "ORB feature detector and binary descriptor," http://scikit-image.org/docs/dev/auto examples/plot_orb.html (last accessed Aug. 17, 2016). For further information on ORB Descriptor, reference may be had to Ethan Rublee, et al., "ORB: an efficient alternative to SIFT or SURF," which is incorporated herein by reference for all purposes.

Combined Feature Detection and Descriptor:

In some implementations, the feature detection engine 506 and the feature description engine 510 can be combined, as demonstrated in Convolutional Neural Networks (CNNs). A convolution neural network is a type of deep neural network that is widely used in object recognition tasks. A general CNN evaluation pipeline usually consists of the following layers: (i) the convolution layer uses different filters to extract different features from the input image with each filter containing a set of "learnable" parameters that will be derived after the training stage; (ii) the activation layer decides whether to activate the target neuron or not; (iii) the pooling layer reduces the spatial size of the representation to reduce the number of parameters and consequently the computation in the network; and (iv) the fully connected layer connects all neurons to all activations in the previous layer. CNNs have proven very useful in areas such as feature recognition and classification in images from visual sensors. CNNs have managed to identify faces, objects and traffic signs for autonomous robots and vehicles. CNNs are data centric and require heavy computation. In the last few years, increases in available storage and computation capabilities have enabled CNNs to achieve success in supervised perception tasks of key features in images from visual sensors. After training for days or even weeks on a large data set, a CNN can be capable of in real-time perception of key features in images. For example, CNNs have achieved top results with ImageNet Large Scale Visual Recognition Challenge (ILSVRC) dataset, which contains 1-2 million images in over 1000 categories.

Bag-of-Words

One implementation of feature extractor 1102 performs bag-of-words extraction, determining from one image a byte array, sparse histogram over vocabulary. Accordingly, in an implementation, Bag-of-words processing includes using a list of feature descriptors in one image to extract Bag-of-words feature for one image. For example, in an image having 400 features with 400 corresponding descriptors, and a bag-of-word feature with the size of 256 bits. The resulting Bag-of-words is a 256-bit array, and one image only needs/has one 256 bit array. Bag-of-words is useful in performing relocalization as described herein below in further detail. Bag-of-words can indicate among A, B, C images, an image D has a matching score individually D-A, D-B, D-C. Say for example that D-B has the highest score, and then the camera taking image D is closest to the camera pose used when taking image B, not A or C.

One implementation of feature extractor 1102 adaptively adjusts a threshold that is applied to a number of features needed in order for the system to keep track of a moving object. Such intelligent thresholds include a threshold that is adaptively adjusted based on device movement, sensor readings, situational or environmental variables (e.g., low light, fog, bright light, and so forth) or combinations thereof. Once a sufficient number of features (e.g., above the threshold) are identified, the system will continue to track an object. Otherwise, the system does not track the object. Feature extractor 1102 will adaptively adjust the threshold based on device movement and other sensor levels.

SFT: Generating Pose Information from Feature Extraction Results and Data from Auxiliary Sensors Sensor fusion based tracker (SFT) 1112 determines how to smartly use feature extraction results and data from one or more auxiliary sensors (IMU 210, GPS receiver 212) to generate pose accurately and rapidly. Sensor fusion based tracker 1112 performs initialization for the system state, feature extractor initial state, interaction with map state, and other states. Sensor fusion based tracker 1112 has logic to decide how to initialize the state including use how many images to skip, and any other initialization steps for specific hardware.

In an implementation, sensor fusion based tracker 1112 performs buffer management for the auxiliary sensors.

Timestamps of the data from the auxiliary sensors are corrected and aligned. Additionally, data information from the auxiliary sensors that have not been processed yet is maintained in a buffer.

Generating Pose Information for a Quadocular-Auxiliary Sensor where an IMU and a GPS Receiver are Used as the Auxiliary Sensors:

Propagation: In a quadocular-auxiliary sensor with two auxiliary sensors, an intermediate propagated pose is estimated using first propagated pose from image information together with second propagated pose from data from one auxiliary sensor. A third propagated pose is estimated from the second auxiliary sensor. A final pose is estimated from the intermediate pose and the third propagated pose. Those of ordinary skill in the art will recognize a variety of equivalent variations. In an implementation, an IMU can be the first auxiliary sensor while a GPS receiver can be a secondary auxiliary sensor.

Implementations can employ extended Kalman filtering (EKF), to extrapolate the second propagated pose using inertial data from the multi-axis IMU. Propagation by the IMU can be performed in a number of ways: (i) the propagation happens right after an inertial measurement taken by the IMU arrives; or (ii) delayed propagation happens in a batch right after an image taken by the visual sensors arrives but before the update procedure described below is performed.

In some implementations, a motion sensor keeps a window of readings from the accelerometer of the IMU. The motion sensor computes the variance of the accelerations in the window of accelerator readings and determines whether the mobile unit is moving or static, based on the calculated variance. A variance greater than a predetermined threshold variance indicates the mobile unit is moving, and propagation is performed by using the EKF method. A variance smaller than a predetermined threshold variance indicates the mobile unit is static and propagation is performed by using the EKF method assuming zero velocity. The predetermined threshold variance can be estimated by various techniques as readily apparent to those skilled in the art.

The GPS receiver supplies the control unit the new geolocation of the autonomous mobile unit. The GPS receiver can provide position, velocity, and covariance information in North-east down (NED) format, or Doppler, pseudo ranges, and covariance information in Earth-centered, Earth-fixed (ECEF) format. Propagation by the GPS receiver can be performed right after a new geolocation arrives from the satellite.

Update: In an implementation, an update process is performed using image information together with IMU and GPS receiver buffer samples. In a single observation implementation, based on the current image observation, the information needed for propagation, e.g., features, poses, map points, etc. is prepared. Then 2D-3D correspondence information for the optical flow tracked 2D features is obtained by directly using 2D-2D correspondences from optical flow tracking results. For the remaining 3D map points, smartly search over 3D with adaptive parameters by: (i) if the remaining number of points is small, e.g., below a threshold, perform a linear search, otherwise, (ii) if the remaining number of points is fairly big, e.g., above a threshold, perform a log(n) search with the use of a kd-tree or octree. Next, perform the update, and generate pose for the current frame using only "good outstanding" points. Alternatively, perform the update twice: first only with high weights "good outstanding" points, then with all the map points. As used herein, the term "good outstanding" points denotes high-quality points, e.g., those points having smaller reprojection error and/or being tracked many times in a good state, which can be selected by application of some heuristics.

Figure 12:
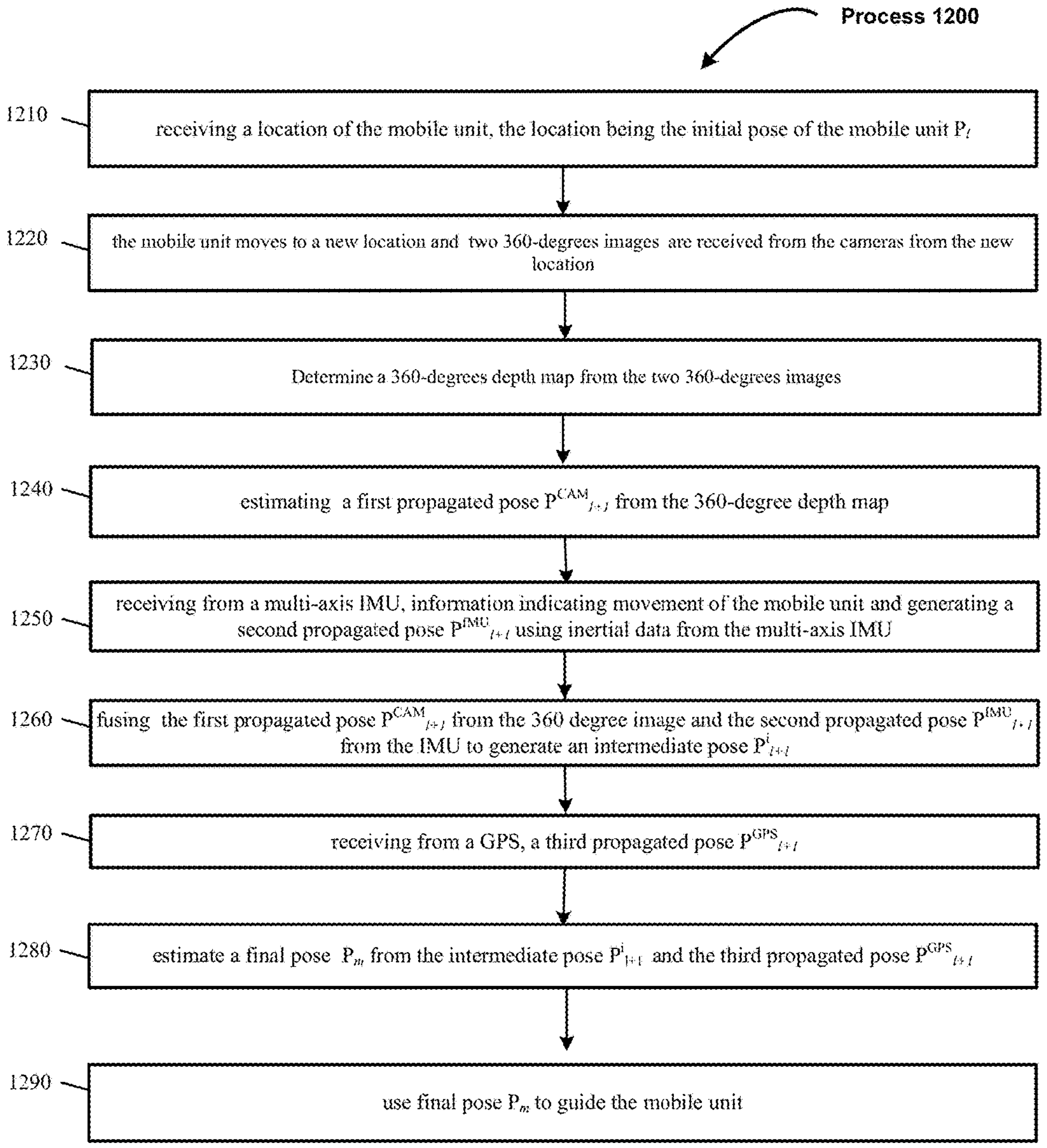
FIG. 12 is a representative method for updating a position of an autonomous unit that includes cameras, a multi-axis inertial measurement unit, and a global positioning system.

FIG. 12 is a representative method 1200 of updating a position of an autonomous mobile unit that includes two or more cameras proving a 360-degrees view, a multi-axis inertial measuring unit, and a GPS receiver. Flowchart 1200 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 12. Multiple actions can be combined in some implementations. For convenience, this flowchart is described with reference to the system that carries out a method. The system is not necessarily part of the method.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as system overview, tracking, mapping, robot implementation, autonomous vehicle, etc.

At action 1210, a location of an autonomous mobile unit is received. Let $P_l$ be the initial pose of the autonomous mobile unit.

At action 1220, the autonomous mobile unit moves to a new location, and two new frames with 360-degrees views are captured by the two back-to-back pairs of cameras at the new location.

At action 1230, a 360-degrees depth map is determined from the two 360-degrees views.

At action 1240, a first propagated pose, $P^{CAM}_{l+1}$, is estimated from the 360-degrees depth map.

At action 1250, information is received from the IMU and a second propagated pose, $P^{IMU}_{l+1}$, is estimated from the inertial data from the IMU.

At action 1260, the first propagated pose $P^{CAM}_{l+1}$ from the 360-degree image frame, and the second propagated pose $P^{IMU}_{l+1}$ from the IMU is fused to generate an intermediate pose $P_{l+1}{}^{i}$ with extended Kalman filtering (EKF).

At action 1270, a third propagated pose $P^{GPS}_{l+1}$ is received from the GPS receiver.

At action 1280, a final pose $P_m$ is estimated from the intermediate pose $P^{i}_{l+1}$ and the third propagated pose $P^{GPS}_{l+1}$ with extended Kalman filtering (EKF).

At action 1290, the final pose $P_m$ is used to guide the autonomous mobile unit.

Other implementations of the method described in this section can include a non-transitory computer readable storage medium storing instructions executable by a processor to perform any of the methods described above. Yet another implementation of the method described in this section can include a system including one or more memory and one or more processors operable to execute instructions, stored in the memory, to perform any of the methods described above.

In some implementations, the IMU may fail to provide inertial data, and the intermediate pose is determined using the first propagated pose from the images. In some implementations, one or more cameras in the multi-ocular system might fail, resulting in an image without a 360-degrees view. A first propagated pose is estimated from remaining operational cameras. In some implementations, all the cameras can fail in the multi-ocular system and data from the IMU is used to determine the intermediate propagated pose. In some implementations, the GPS receiver may fail to provide geolocation data, and the intermediate propagated pose can be used as the final pose.

SIM: Smart Map Interaction and Localize

Smart interaction with map (SIM) processor 1114 enables smart interaction by a device being guided (i.e., receiving positional awareness information from the quadocular-auxiliary sensor system) with a known map in order to localize itself. Accordingly, one implementation of a smart interaction map processor 1114 processing includes: (a) Perform a query of the map based on a need and a current status. Some query components included by specific implementations are map points (latitude, longitude, uncertainty, average reprojection error, etc.), keyrigs' poses, and occupancy grid (one layer or multiple layers). As used herein, the term keyrig denotes a set of image data received. In some implementations, the sets of image data include feature points and pose information. The pose information includes a location of the mobile device and view of the camera that captured the image data. The sets of image data are referred to collectively as keyrigs; (b) If the map as a whole is not big, e.g., meets a particular threshold size, return the entire map; (c) Otherwise, if the map is big, e.g., meets or exceeds a particular threshold size and covers large areas, e.g., spatial area meets or exceeds a particular threshold, smartly grab a local region of map based on the device's current position; (d) If some area of the map is known to have bad quality, don't use it; and (e) Adaptively down-sample map based on system performance according to an adaptive parameter. For example: (i) if the 3D feature-based tracking process has been accurate, e.g., below a threshold number of errors or invocations of relocalization processing to relocalize a device that has lost its place, then reduce the sample size to conserve resources, otherwise, (ii) if the device is getting lost frequently, e.g., meets or exceeds a threshold, then increase the sample size to provide better tracking.

SDAR: Manage Localization State and Response Strategy

System diagnostics and response (SDAR) processor 1103 performs system level management of the current localizing state of a quadocular-auxiliary sensor and provides response strategy. In one implementation, the system diagnostics and response processor 1103 monitors tracked map points and corresponding reprojection error, monitors the longevity of untracked map points, and suggests actions to mapping module, monitors device speed/acceleration/jitter/drift, monitors map "activity" (i.e., is it updated regularly?), performs newly added map contribute enough to the overall mapping (i.e., so it's not doing useless hovering?), monitors keyrig topology (i.e., stretch enough or too much?), suggests when and where the device should add keyrig, and monitors feature extractor pipeline Relocalize a Lost Device Re-locator 1122 recovers a device that has lost track of its positional from this state. Once re-locator 1122 returns the lost device back on track, the device can resume normal interacting with smart interaction map processor 1114, and/or can contribute to building maps, using the techniques described herein below.

System Overview of Map Hosting Server System

Figure 13:
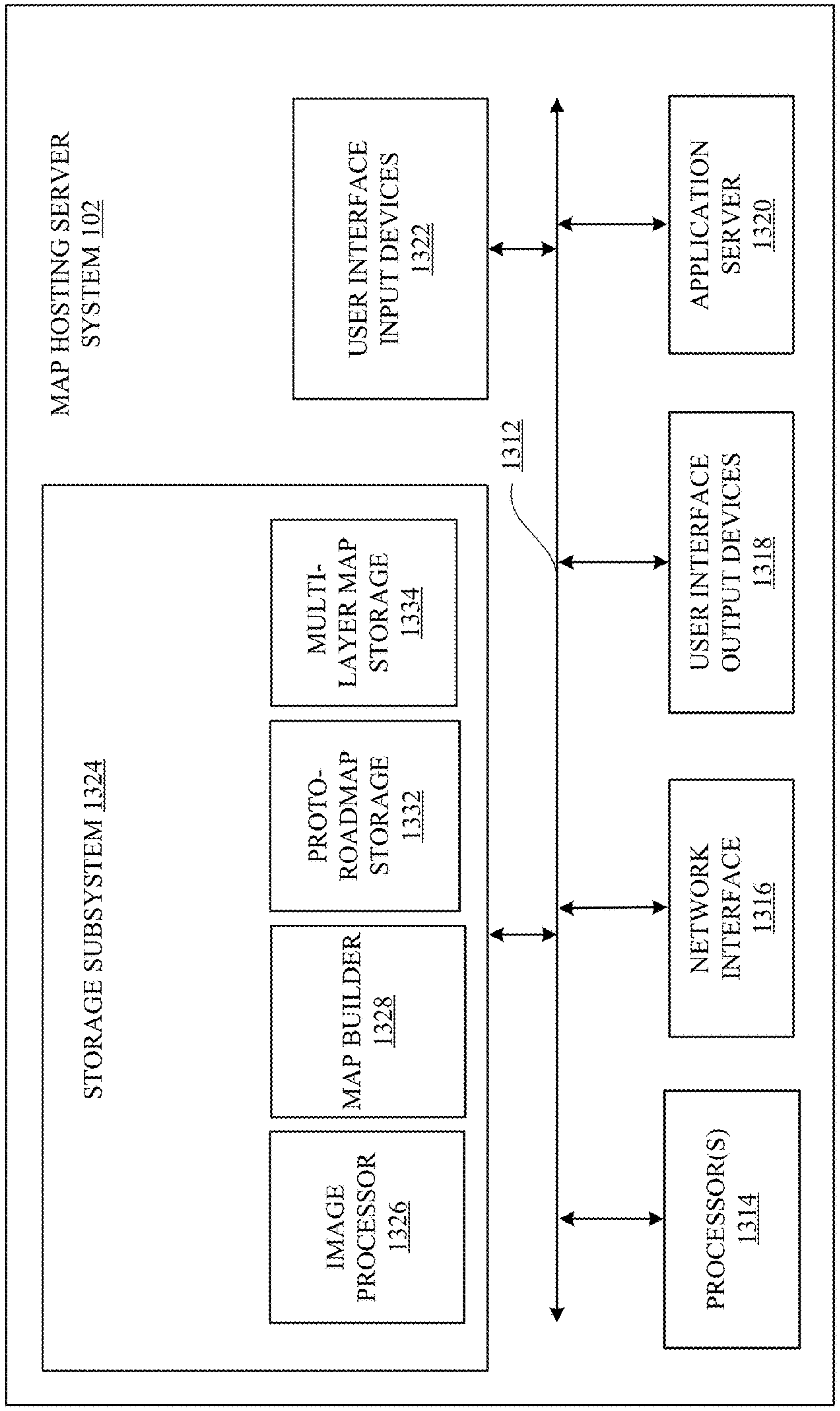
FIG. 13 illustrates a simplified block diagram of a map hosting server system.

FIG. 13 is a simplified block diagram of a map hosting server system 102 in FIG. 1 that can be used to host the map server. Map hosting server system 102 typically includes a processor subsystem 1314 which communicates with a number of peripheral devices via bus subsystem 1312. These peripheral devices may include a storage subsystem 1324, user interface input devices 1322, user interface output devices 1320, and a network interface subsystem 1316. The input and output devices allow user interaction with map hosting server system 102. Network interface subsystem 1316 provides an interface to outside networks, including an interface to the communication network 1318, and is coupled via communication network 1318 to corresponding interface devices in other computer systems. Communication network 1318 may comprise many interconnected computer systems and communication links. These communication links may be wireline links, optical links, wireless links, or any other mechanisms for communication of information, but typically it is an IP-based communication network. While in one embodiment, communication network 1318 is the Internet, in other embodiments, communication network 1318 may be any suitable computer network.

The physical hardware component of network interfaces are sometimes referred to as network interface cards (NICs), although they need not be in the form of cards: for instance they could be in the form of integrated circuits (ICs) and connectors fitted directly onto a motherboard, or in the form of macrocells fabricated on a single integrated circuit chip with other components of the computer system.

User interface input devices 1322 may include a keyboard, pointing devices such as a mouse, trackball, touchpad, or graphics tablet, a scanner, a touch screen incorporated into the display, audio input devices such as voice recognition systems, microphones, and other types of input devices. In general, use of the term "input device" is intended to include all possible types of devices and ways to input information into map hosting server system 102 or onto computer network 1318.

User interface output devices 1320 may include a display subsystem, a printer, a fax machine, or non-visual displays such as audio output devices. The display subsystem may include a cathode ray tube (CRT), a flat panel device such as a liquid crystal display (LCD), a projection device, or some other mechanism for creating a visible image. The display subsystem may also provide a nonvisual display such as via audio output devices. In general, use of the term "output device" is intended to include all possible types of devices and ways to output information from map hosting server system 102 to the user or another machine or computer system.

Storage subsystem 1324 stores the basic programming and data constructs that provide the functionality of certain embodiments of the present invention. For example, the various modules implementing the functionality of certain embodiments of the invention may be stored in storage subsystem 1324 such as the image processor 1326, the map builder 1328, the proto-roadmap storage 1332 and the master multi-layer map storage 1334. The software modules the image processor 1326 and the map builder 1328 are generally executed by processor subsystem 1314.

Storage subsystem 1324 typically includes a number of memories including a main random access memory (RAM) for storage of instructions and data during program execution, a read only memory (ROM) in which fixed instructions are stored, and a file storage subsystem that provides persistent storage for program and data files, and may include a hard disk drive, a floppy disk drive along with associated removable media, a CD ROM drive, an optical drive, or removable media cartridges. The map storages 1332, 1334 and modules implementing the functionality of certain embodiments of the invention may have been provided on a computer readable medium such as one or more CD-ROMs and may be stored by file storage subsystem. The storage subsystem 1324 contains, among other things, computer instructions which, when executed by the processor subsystem 1314, cause the map hosting server system to operate or perform functions as described herein. As used herein, processes and software that are said to run in or on "the map server" or "the map hosting server system," execute on the processor subsystem 1314 in response to computer instructions and data in the storage subsystem 1324 including any other local or remote storage for such instructions and data.

Bus subsystem 1312 provides a mechanism for letting the various components and subsystems of map hosting server system 102 communicate with each other as intended. Although bus subsystem 1312 is shown schematically as a single bus, alternative embodiments of the bus subsystem may use multiple busses.

Map hosting server system 102 itself can be of varying types including a personal computer, a portable computer, a workstation, a computer terminal, a network computer, a television, a mainframe, a server farm, or any other data processing system or user device. Due to the ever changing nature of computers and networks, the description of map hosting server system 102 depicted in FIG. 13 is intended only as a specific example for purposes of illustrating the preferred embodiments of the present invention. Many other configurations of map hosting server system 102 are possible having more or less components than the map hosting server system depicted in FIG. 13.

In addition, while the present invention has been described in the context of a fully functioning data processing system, those of ordinary skill in the art will appreciate that the processes herein are capable of being distributed in the form of a computer readable medium of instructions and data and that the invention applies equally regardless of the particular type of signal bearing media actually used to carry out the distribution. As used herein, a computer readable medium is one on which information can be stored and read by a map hosting server system. Examples include a floppy disk, a hard disk drive, a RAM, a CD, a DVD, flash memory, a USB drive, and so on. The computer readable medium may store information in coded formats that are decoded for actual use in a particular data processing system. A single computer readable medium, as the term is used herein, may also include more than one physical item, such as a plurality of CD ROMs or a plurality of segments of RAM, or a combination of several different kinds of media. As used herein, the term does not include mere time varying signals in which the information is encoded in the way the signal varies over time.

Figure 14:
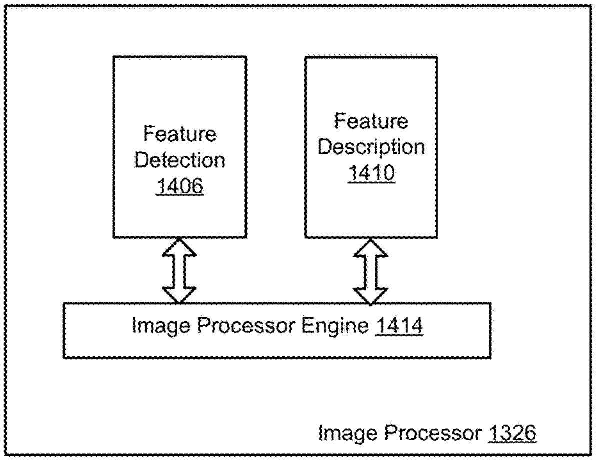
FIG. 14 illustrates an example of an image processor in FIG. 13.

FIG. 14 illustrates an example of an image processor 1326 in FIG. 13. An Image processor 1326 includes a feature detection processor 1406 and a feature description processor 1410 under control of an image processor engine 1414.

The feature detection processor 1406 performs feature detection upon image frames using Shi-Tomasi. Features are "interesting" parts of an image. The Shi-Tomasi feature detection includes methods that aim at computing abstractions of image information and making local decisions at every image point whether there is an image feature of a given type at that point or not. The resulting features will be subsets of the image domain, often in the form of isolated points. A type of feature can be (A) two small Eigen values: the feature is not interesting; (B) one small, one big value: the feature is likely an edge; (C) two big values: the feature is likely a corner; and (D) other type of features. Accordingly, in an implementation, processing includes: (a) action 1: calculate Eigen value of the intensity value of each pixel and its surrounding pixels, and determine (i) whether the feature is of interest; and (ii) for features of interest, a type of feature; and (b) action 2: refine by applying non-maximum suppression, applying spatial binning, applying heuristics or applying other types of refinement. The feature detection processor 1406 is used to detect 2D feature points of road markings in the ground perspective view layer in the multi-layer map. The feature detection processor 1406 also detects 2D feature points of objects in the spatial perspective view layer in the multi-layer map.

The feature description processor 1410 performs feature description on detected features. The feature description includes methods to identify each detected points in an image uniquely. Feature description can be used to compare and match feature points between different images. One implementation of feature description engine 1410 uses a SIMD-accelerated ORB descriptor to describe features. The description of a feature can be used for matching purposes and describe a feature's uniqueness. The ORB descriptor approach was selected for its relative rotational invariance and immunity to Gaussian image noise. One example of an ORB feature detector and binary descriptor can be found at "ORB feature detector and binary descriptor," http://scikit-image.org/docs/dev/auto examples/plot_orb.html (last accessed Aug. 17, 2016). For further information on ORB Descriptor, reference may be had to Ethan Rublee, et al., "ORB: an efficient alternative to SIFT or SURF," which is incorporated herein by reference for all purposes.

In some implementations, the feature detection processor 1406 and the feature description processor 1410 can be combined, as demonstrated in Convolutional Neural Networks (CNNs). A convolution neural network is a type of deep neural network that is widely used in object recognition tasks. A general CNN evaluation pipeline usually consists of the following layers: (i) the convolution layer uses different filters to extract different features from the input image with each filter containing a set of "learnable" parameters that will be derived after the training stage; (ii) the activation layer decides whether to activate the target neuron or not; (iii) the pooling layer reduces the spatial size of the representation to reduce the number of parameters and consequently the computation in the network; and (iv) the fully connected layer connects all neurons to all activations in the previous layer. CNNs have proven very useful in areas such as feature recognition and classification in images from visual sensors. CNNs have managed to identify faces, objects and traffic signs for autonomous robots and vehicles. CNNs are data centric and require heavy computation. In the last few years, increases in available storage and computation capabilities have enabled CNNs to achieve success in supervised perception tasks of key features in images from visual sensors. After training for days or even weeks on a large data set, a CNN can be capable of in real-time perception of key features in images. For example, CNNs have achieved top results with ImageNet Large Scale Visual Recognition Challenge (ILSVRC) dataset, which contains 1-2 million images in over 1000 categories. In autonomous vehicles, CNNs can be used to perform lane and vehicle detection while running at frame rates required for a real-time system. A labeled data set is required to represent all possible driving environments (rain, snow, night, day, etc.), and scenarios (pedestrian crossing the road, a car in front, mailbox by the side of the road, etc.). CNNS can be used to determine semantic information of road markings in the ground perspective view layer and objects in the spatial perspective view layer in the multi-layer map. Various versions of CNNs can be used to implement the technology disclosed herein, e.g., AlexNet, Overfeat CNN, R-CNN, etc.

Figure 15:
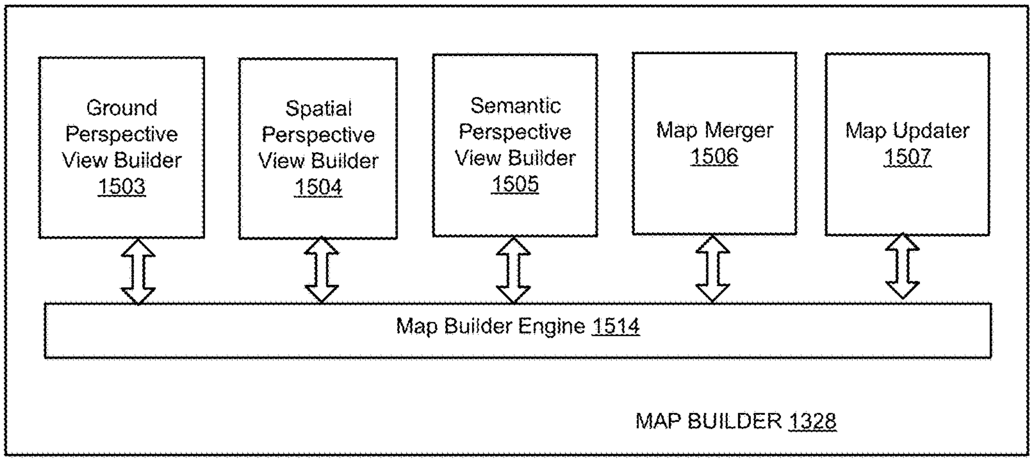
FIG. 15 illustrates an example of a map builder in FIG. 13.

FIG. 15 illustrates an example of a map builder 1328 in FIG. 13 for implementations in which the multi-layer maps are built by the map server. The map builder 1328 includes a ground perspective view builder 1503, a spatial perspective view builder 1504, a semantic perspective view builder 1505, a map merger 1506, and a map updater 1507 under control of a map builder engine 1514. The ground perspective view builder 1503 builds the ground perspective view layer on top of the proto-roadmap layer in the multi-layer map with the help of the feature detection processor 1406.

The ground perspective view builder 1503 adds information regarding the road markings, e.g., broken white lines, solid white lines, double yellow solid lines, broken yellow lines, edge lines, HOV lanes, freeway entrances and exits, pedestrian crosswalks, stop lines, roundabouts, signalized intersections, speed humps, bike only lanes, rail crossings, and yield lines.

The spatial perspective view builder 1504 builds the spatial perspective view layer on top of the ground perspective view layer in the multi-layer map with the help of the feature detection processor 1406. The spatial perspective view builder 1504 adds information regarding various objects or obstacles located in the area. In one implementation, the object can be moving or non-moving. Examples of non-moving objects include traffic light signals, sidewalks, traffic signs, benches, buildings, fire hydrants, etc. Examples of moving objects include other vehicles, pedestrians, trains, etc.

The semantic view builder 1505 builds the semantic view layer is created on top of the spatial perspective layer with the help of the feature description processor 1410 or a combined feature detection processor 1406 and feature description processor 1410. The semantic view builder 1505 adds semantic information about the road markings from the ground perspective layer and non-moving and moving objects from the spatial perspective layer. The semantic information is used to classify the objects in spatial perspective view as moving or non-moving.

The map merger 1506 mergers one or more newly created multi-layer maps with the master multi-map in storage 1334. The map updater 1507 updates certain parts of the master multi-layer map in storage 1334 with information from one or more newly created multi-layer maps. The master multi-map is provided via a network(s) 104 to one or more autonomous for guidance at a future time. The proto-roadmaps stored in storage 1332 is provided via the network(s) 104 to one or more autonomous for guidance in locations for which multi-layer maps are not available, and the provided proto-roadmaps can be utilized to build multi-layer maps for the locations mentioned above.

Multi-Layer Mapping

In implementations, geometric information obtained by a 3D feature-based tracking process is represented using a descriptive point cloud representation. The descriptive point cloud is a set of sparse 3D points, where each point encodes a 3D geometric location, an uncertainty of the geometric location, and a set of 2D location plus appearance-based descriptors, each observed by a keyrig. A keyrig contains (i) a Timestamp where the images in the keyrig is captured; (ii) a pose (i.e. the transformation from the quadocular-auxiliary sensor's coordinate to the map coordinate at the current time) and its uncertainty; and (iii) a sequence of readings from the auxiliary sensors starting from a first temporal point before the timestamp to a second temporal point after the timestamp. Some implementations further include a flag to specify whether the quadocular-auxiliary sensor is moving or static. This flag can be set from information obtained from the IMU readings.

Construction of a Multi-Layer Map

With the help of the captured keyrigs by autonomous units with quadocular-auxiliary sensors and a proto-roadmap supplied by the map server, a 3D multi-layer map can be built for navigation with an accuracy in a range of 5 centimeter to 10 centimeter. In one implementation, the multi-layer map is built at the map server after it received keyrigs from one or more autonomous units. The newly created map is stored or merged with an existing map at the map server. In another implementation, multi-layer maps are built by autonomous units with quadocular-auxiliary sensors and sent to the map server to be stored.

Figure 16:
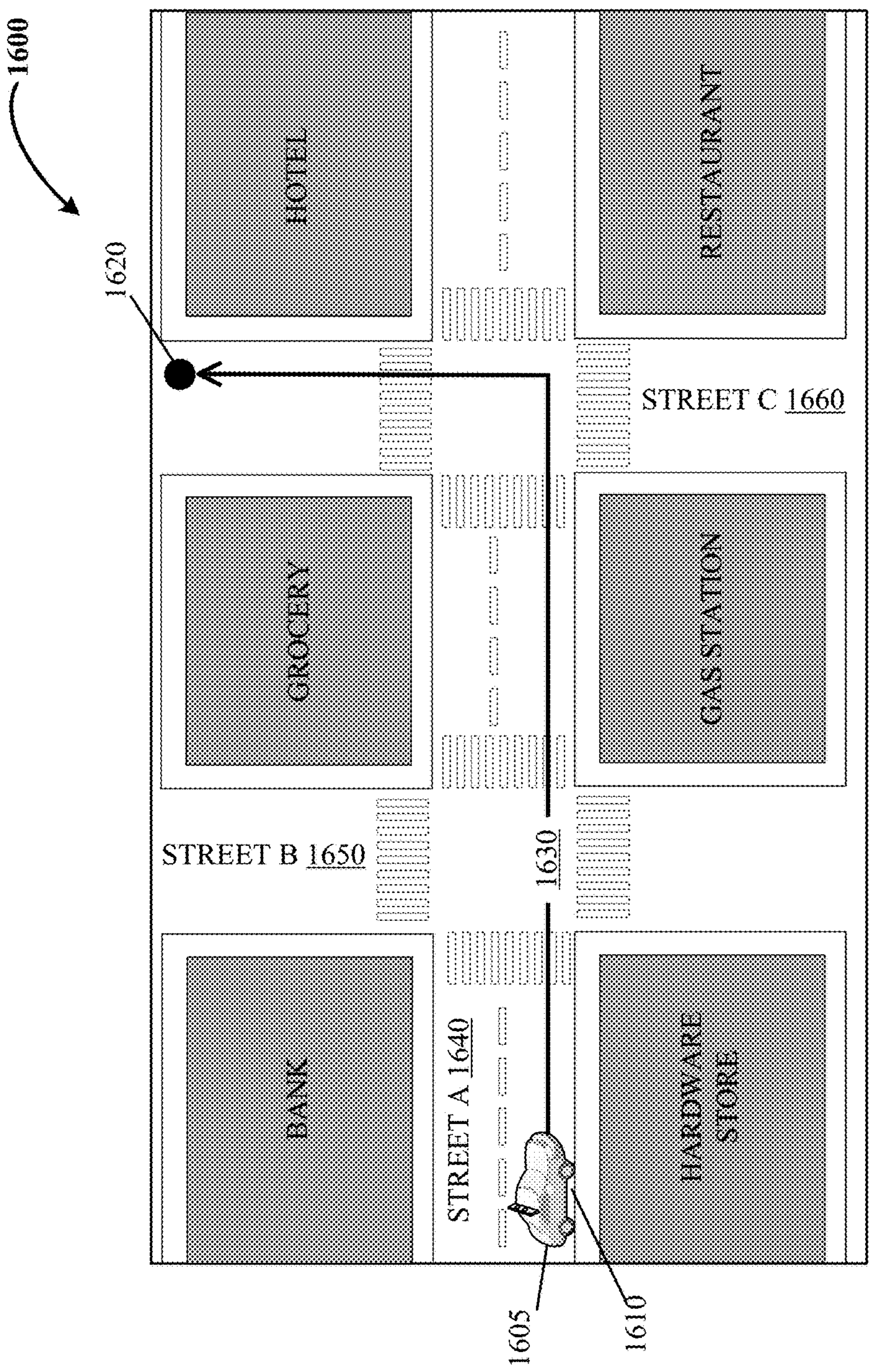
FIG. 16 illustrates an example of a proto-roadmap with only road information.

The construction of a multi-layer map begins with a proto-map. The multi-layer map building technology disclosed will be illustrated with reference to a set of keyrigs captured by an autonomous vehicle 1605 with a quadocular-auxiliary sensor in FIG. 16. FIG. 16 illustrates an example of a proto-roadmap 1600 provided to an autonomous vehicle 1605. The autonomous vehicle 1605 is currently at 1610 and traveling to its final destination 1620 through the path 1630. The proto-roadmap 1600 contains information regarding roads/streets/lanes that the autonomous vehicle 1605 will travel through (street A 1640 and street C 1660) or cross (street B 1650) to reach its destination. The proto-roadmap 1600 also provides information regarding various points of interests and service locations along the path 1620 of the autonomous vehicle 1605.

Figure 17:
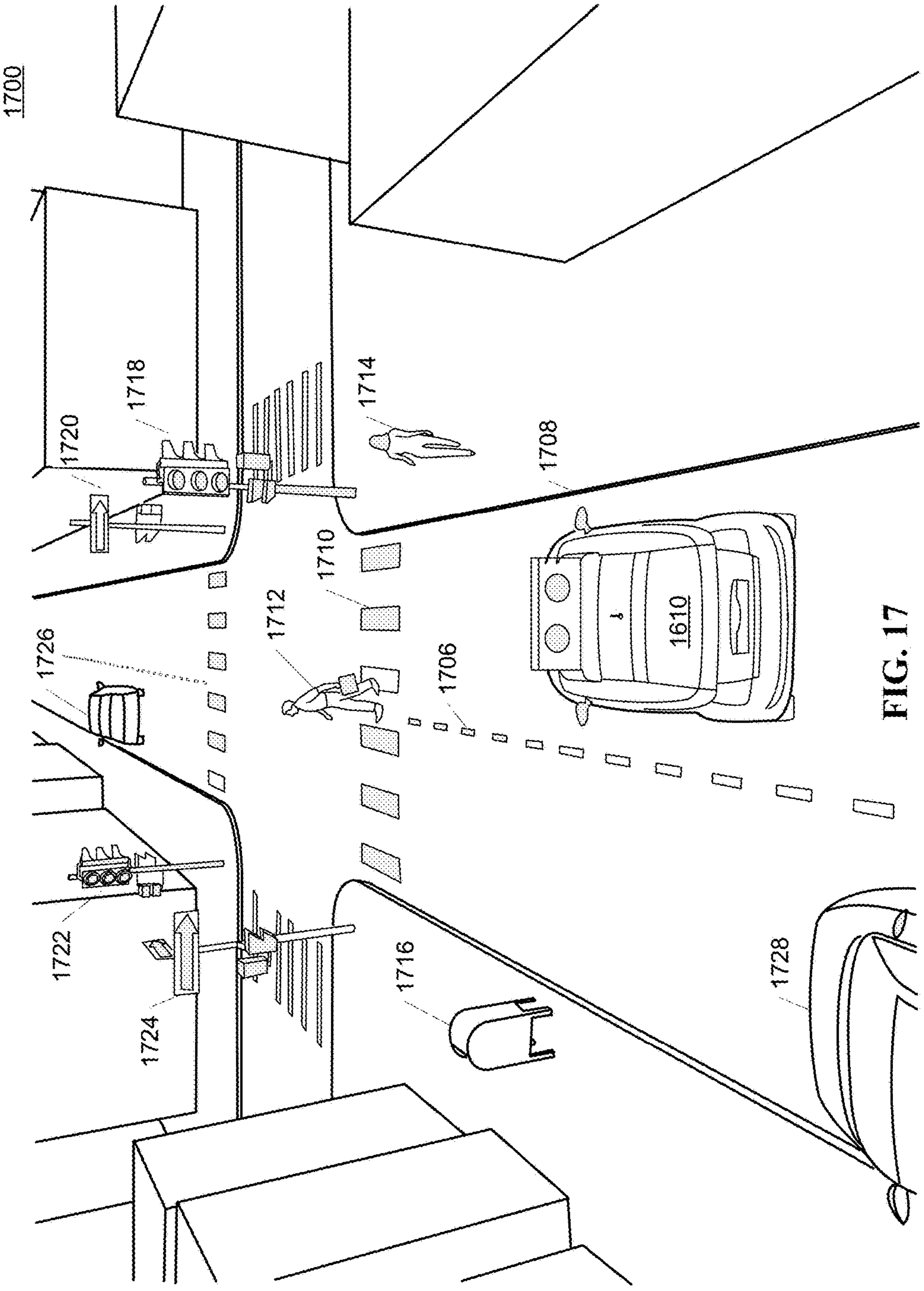
FIG. 17 illustrates an example surrounding scenery near an autonomous vehicle during travel along one of the roads in the proto-roadmap in FIG. 16.

FIG. 17 illustrates the surrounding scenery 1700 near the autonomous vehicle 1605 at location 1610. The autonomous vehicle 1605 is on a two-lane road in an urban environment with a car in front 1726 and a car at the back 1728. The road is divided by a lane divider 1706, and there is a pedestrian crossing 1710 in front of the autonomous vehicle 1605. Other obstacles situated near the autonomous vehicle 1605 include: a pedestrian crossing the road 1712, a pedestrian on the sidewalk 1714, curb side 1708, a mailbox 1716, and traffic lights/signs 1718, 1720, 1722, 1724. A set of keyrigs will be captured by the quadocular-auxiliary sensor of autonomous vehicle 1605 at location 1610, each keyrig containing: (i) a timestamp where the images in the keyrig is captured; (ii) a pose (latitude, longitude position of the car, and orientation); (iii) a pair of 360-degrees images captured by the cameras, and (iv) a sequence of readings from the auxiliary sensors. The pair of 360-degrees images will have visual information regarding the car in front 1726, the car at the back 1728, the lane divider 1706, the pedestrian crossing 1710, the pedestrian crossing the road 1712, the pedestrian on the sidewalk 1714, the curb side 1708, the mailbox 1716, and the traffic lights/signs 1718, 1720, 1722, 1724.

Figure 18:
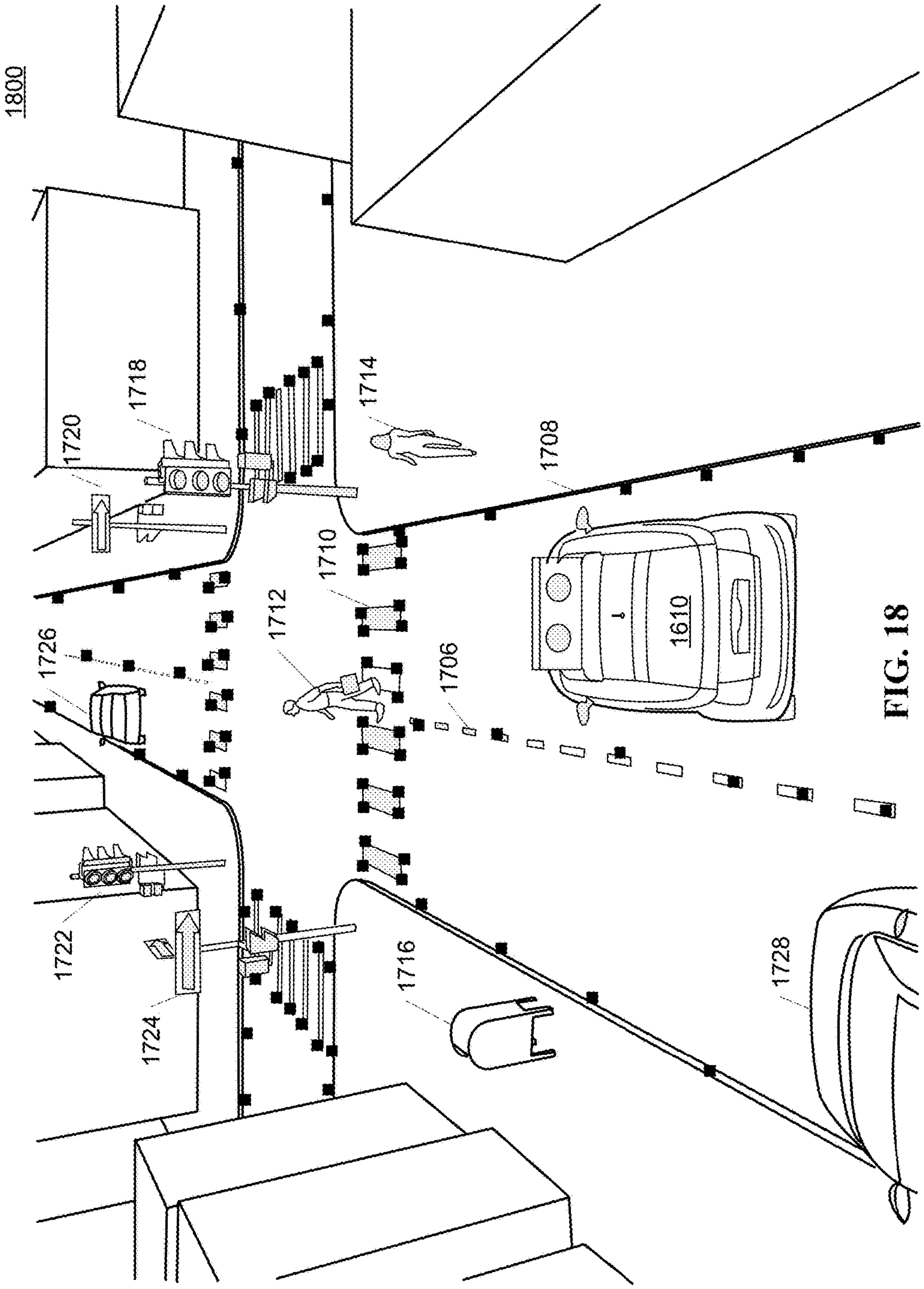
FIG. 18 illustrates detection of 2D features points of road markings in the surrounding scenery in FIG. 17.

In the next step of the construction of the multi-layer map, the ground perspective view layer 1800 is created on top of the proto-roadmap layer by adding information regarding the road markings to the map. FIG. 18 illustrates detection of 2D features points of road markings in the surrounding scenery near the autonomous vehicle 1605 at location 1610. Feature points for the lane divider 1706, the roadside curbs 1708 and the pedestrian crossing 1710 will be determined from the two 360-degrees images. In some implementations, Shi-Tomasi feature detection is employed to determine the feature points from the image frames. Features are assigned descriptors using ORB feature description. Optical flow techniques are used to determine 2D correspondences in the images, enabling matching together features in different images. The 2D features points from the first 360-degrees image and the 360-degrees second image will be triangulated to determine the depth of the feature point. A location of feature points will be generated for each of the feature points for all the road markings detected. The map entry will include a global position, including longitude and latitude, and feature descriptors of the object to the ground perspective view layer. The map entry might further include a time of day (e.g., daytime, nighttime, etc.) and/or the weather condition (e.g., sunny, cloudy, rainy, etc.) when the keyrig was captured.

Figure 19:
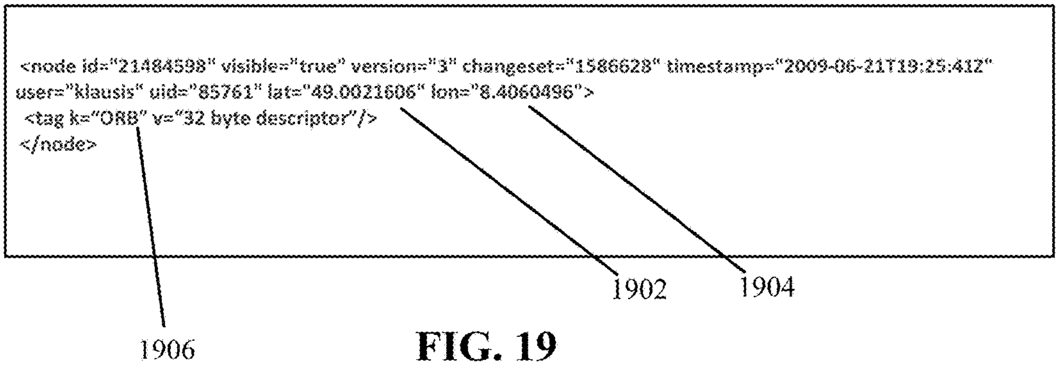
FIG. 19 illustrates an example map entry for a 2D feature point of a road marking in extensible markup language.

FIG. 19 illustrates an example map entry for a 2D feature point of a road marking in extensible markup language. The map entry includes a longitude 1904, a latitude 1902, and an ORB feature description 1906.

Figure 20:
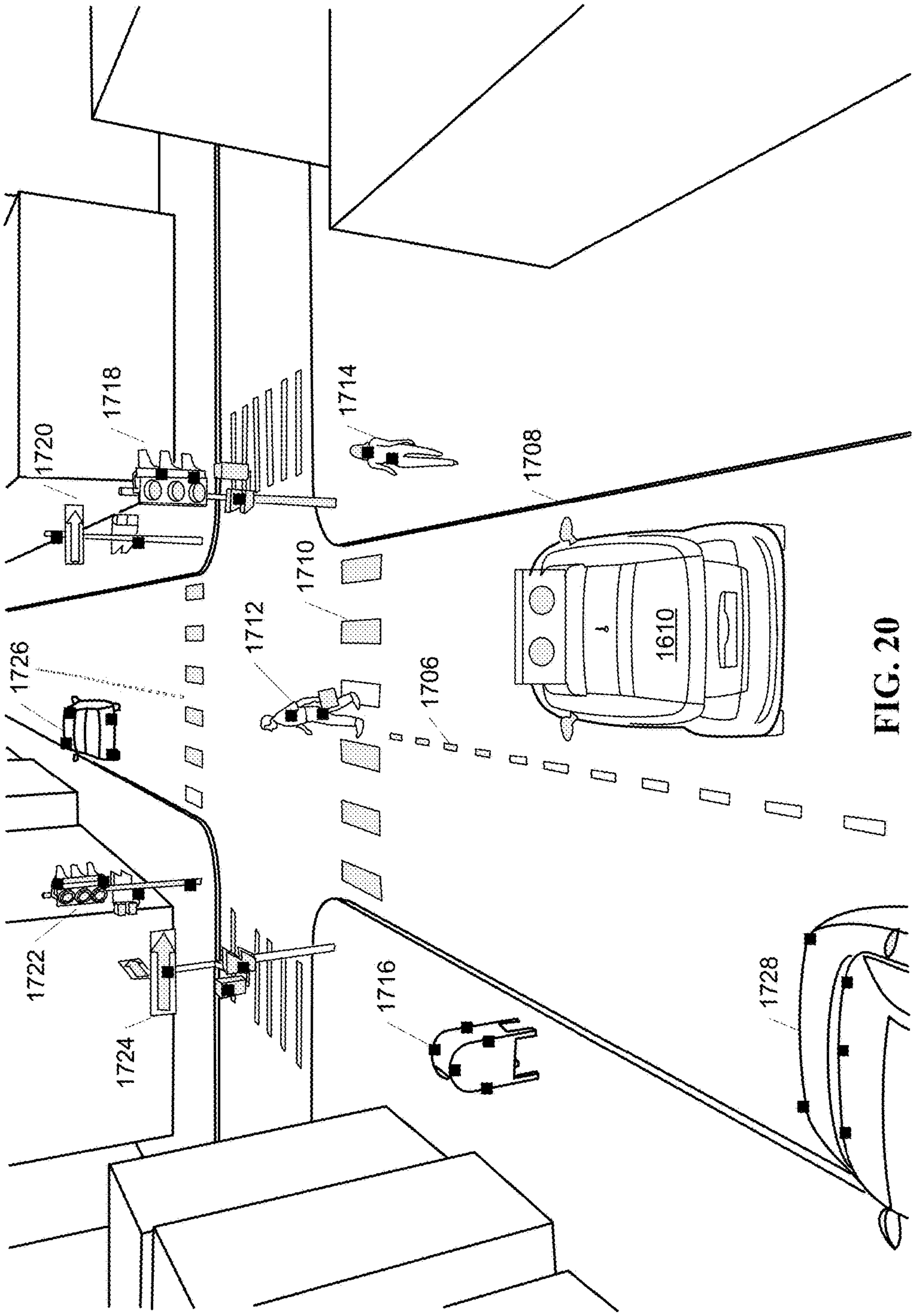
FIG. 20 illustrates detection of 2D features points of objects in the surrounding scenery in FIG. 17.

After the construction of the ground perspective view layer, the spatial perspective view 2000 is created by adding information regarding objects or obstacles near the autonomous vehicle 1605 to the map. FIG. 20 illustrates detection of 2D features points of objects in the surrounding scenery near the autonomous vehicle 1605 at location 1610. Feature points for the car in front 1726, the car at the back 1728, the pedestrian crossing the road 1712, the pedestrian on the sidewalk 1714, the mailbox 1716, and the traffic lights/signs 1718, 1720, 1722, 1724 will be determined from the two 360-degrees images. In some implementations, Shi-Tomasi feature detection is employed to determine the feature points from the image frames. Features are assigned descriptors using ORB feature description. Optical flow techniques are used to determine 2D correspondences in the images, enabling matching together features in different images. The 2D features points from the first 360-degrees image and the 360-degrees second image will be triangulated to determine the depth of the feature point. A location of feature points will be estimated related to the current position of the autonomous unit. A map entry will be generated for each of the feature points for all the objects detected. The map entry will include a global position, including longitude, latitude and height, and feature descriptors of the object to the ground perspective view layer. The map entry might further include a time of day (e.g., daytime, nighttime, etc.) and/or the weather condition (e.g., sunny, cloudy, rainy, etc.) when the keyrig was captured.

Figure 21:
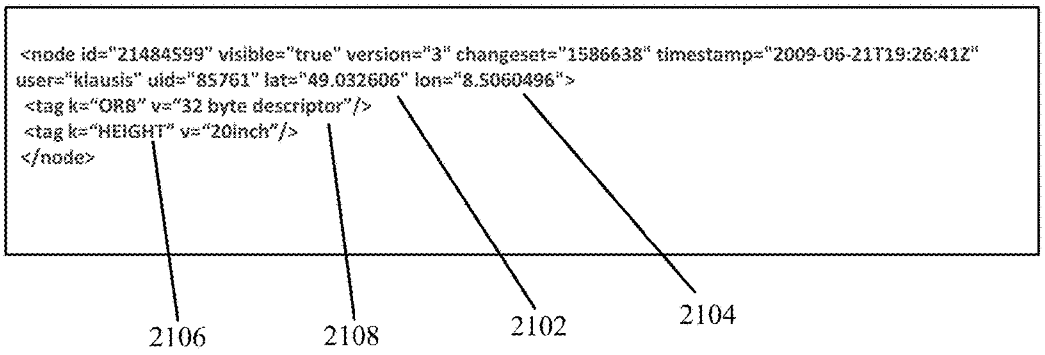
FIG. 21 illustrates an example map entry for a 2D feature point of an object in extensible markup language.

FIG. 21 illustrates an example map entry for a 2D feature point of an object in extensible markup language. The map entry includes a longitude 2104, a latitude 2102, a height 2106 and an ORB feature description 2108. Of course, other techniques can be used to describe 2D feature points for objects in a map entry. Some implementations will include additional elements in a map entry. Some implementations may omit one or more of the elements illustrated in FIG. 21 from a map entry.

Figure 22:
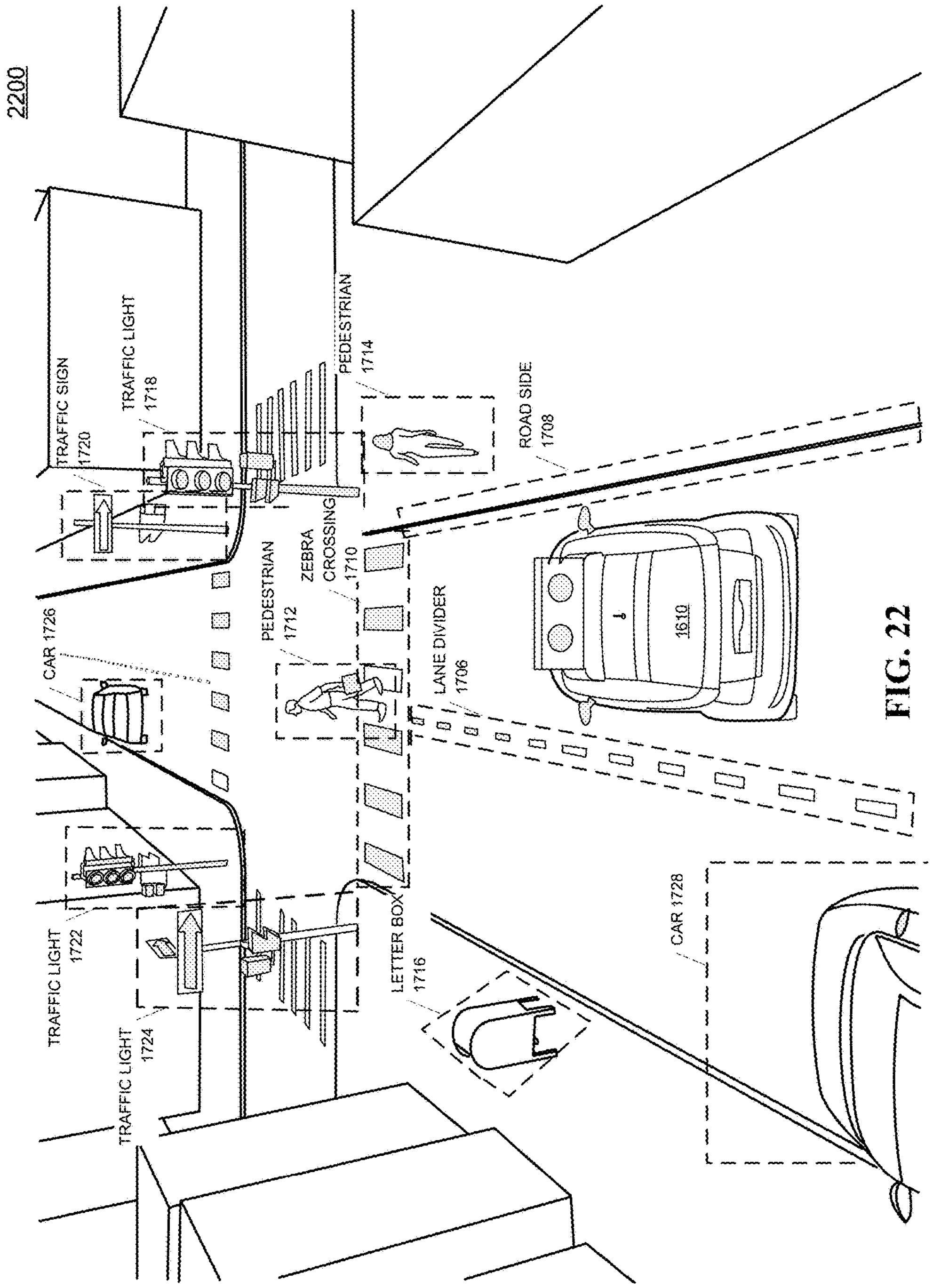
FIG. 22 illustrates semantic identification of road markings, non-moving objects and moving objects in the surrounding scenery in FIG. 17.

In the next step of the construction of a multi-layer map, the semantic perspective view layer 2200 is created on top of the ground perspective view layer and the spatial perspective view layer. The semantic perspective view layer contains semantic information about the road markings from the ground perspective layer and non-moving and moving objects from the spatial perspective layer. In one implementation, the semantic information can be given as a probability, e.g., an object with 74% probability being a train. The semantic information is used to classify the objects in spatial perspective view as moving or non-moving. The non-moving objects from the spatial perspective view layer are added to the multi-layer map. FIG. 22 illustrates semantic identification of the road markings marking identified in the ground perspective layer, and non-moving objects and moving objects in the spatial perspective layer. In some implementations, a convolution neural network (CNN) is employed to identify the semantic information of the feature points. Thereby, the feature points in the ground perspective view layer are identified as a the lane dividers 1706, the roadside curbs 1708, a pedestrian crossing the road 1712, a pedestrian walking on the sidewalk 1714, a mailbox 1716, traffic signal posts 1718, 1720, 1722, 1724, a car in front of the autonomous vehicle 1726, and a car behind the autonomous vehicle 1728. The mailbox 1716 and traffic signal posts 1718, 1720, 1722, 1724 are identified as non-moving objects and are added to the multi-layer map.

Figure 23:
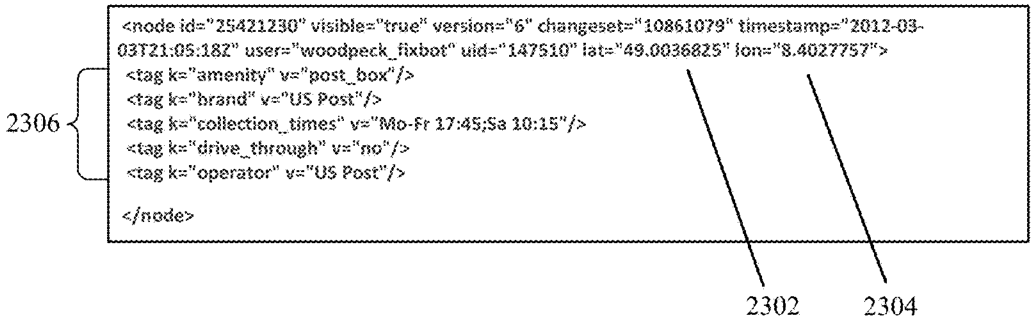
FIG. 23 illustrates an example map entry for an identified non-moving object in extensible markup language.

FIG. 23 illustrates an example map entry for mailbox 1716 in extensible markup language. The map entry includes a longitude 2304, a latitude 2302 and a semantic description 2306.

Figure 24:
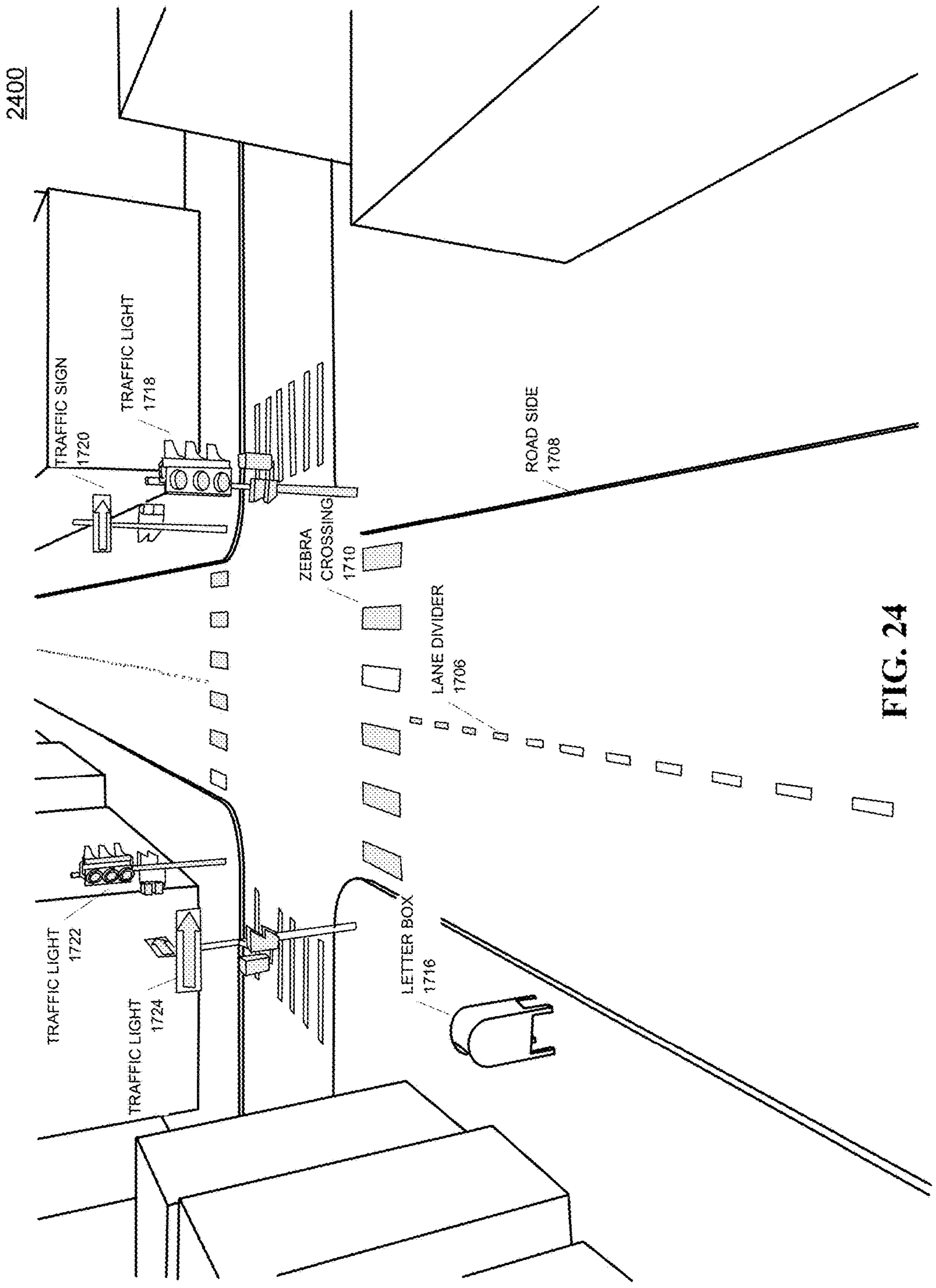
FIG. 24 illustrates an example multi-layer map of surrounding scenery near an autonomous vehicle built during travel along one of the roads in the proto-roadmap in FIG. 16 in accordance with an implementation.

FIG. 24 illustrates an example final 3D multi-layer map 2400 of the surrounding scenery at location 1610 to the stored at the map server for future navigational use by one or more autonomous units. The final multi-layer map 2400 includes the proto-roadmap 1600, the non-moving objects from the spatial perspective view 2000 and the road markings from the ground perspective view 1800.

Map Construction by Autonomous Units

Figure 25:
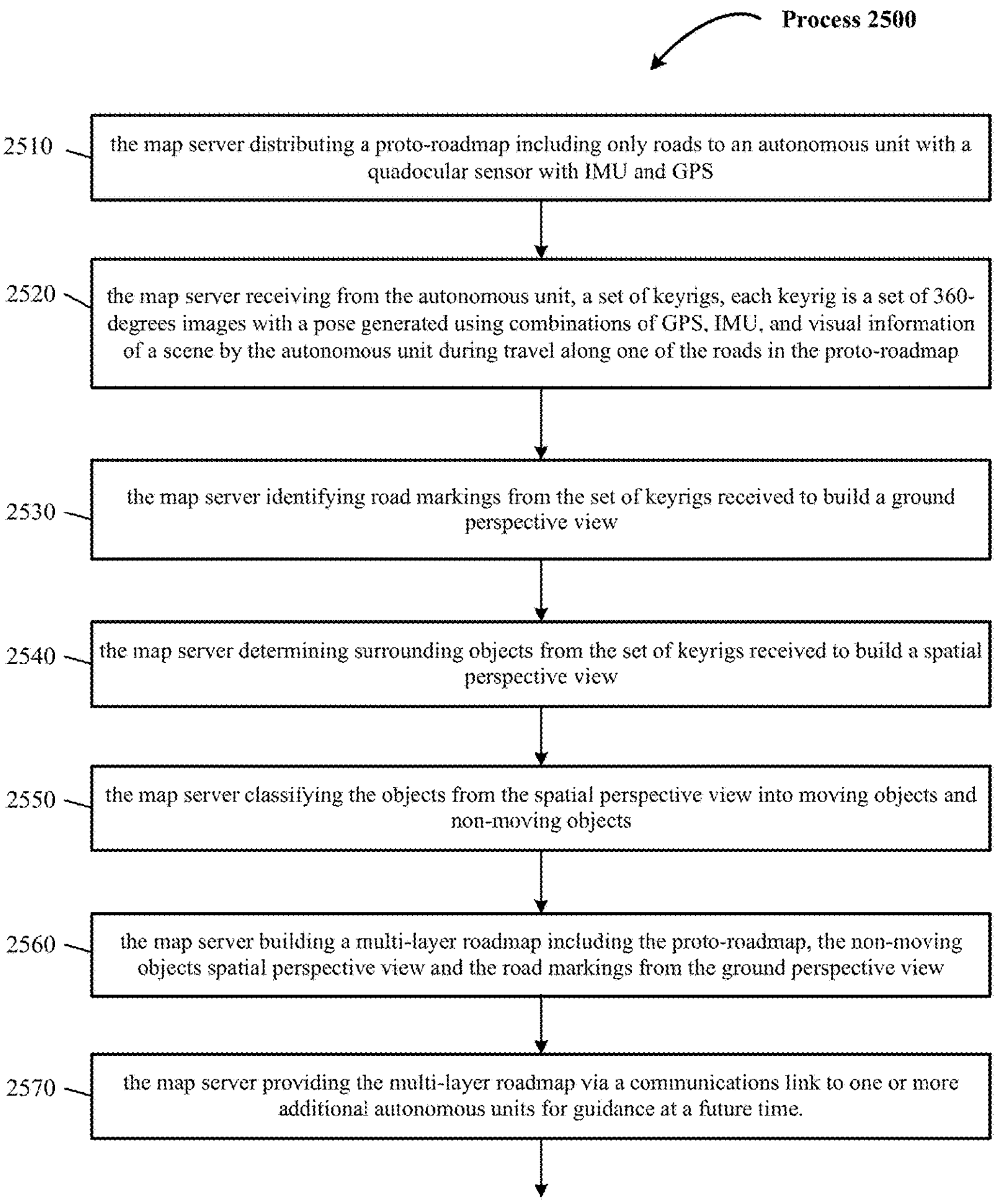
FIG. 25 is a representative method for building multi-layer maps using information sourced by one or more moving autonomous units with quadocular-auxiliary sensory systems.

FIG. 25 is a representative method 2500 for building multi-layer maps using information sourced by one or more moving autonomous units with quadocular-auxiliary sensory systems. Flowchart 2500 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 25. Multiple actions can be combined in some implementations. For convenience, this flowchart is described with reference to the system that carries out a method. The system is not necessarily part of the method.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as system overview of quadocular-auxiliary sensors and the map server, multi-layer map construction, etc.

FIG. 25 includes process 2500 that begins at action 2510, where the map server distributes a proto-roadmap including only roads to an autonomous unit with a quadocular sensor with IMU and GPS.

Process 2500 continues at action 2520 where the map server receives from the autonomous unit, a set of keyrigs, each keyrig is a set of 360-degrees images with a pose generated using combinations of GPS, IMU, and visual information of a scene by the autonomous unit during travel along one of the roads in the proto-roadmap.

At action 2530, the map server identifies road markings from the set of keyrigs received to build a ground perspective view with the help of ground perspective view builder 1503 in map builder 1328.

At action 2540, the map server identifies surrounding objects from the set of keyrigs received to build a spatial perspective view with the help of spatial perspective view builder 1504 in map builder 1328.

At action 2550, the map server classifies the objects from the spatial perspective view into moving objects and non-moving objects with the help of the semantic perspective view builder 1505 in map builder 1328.

At action 2560, the map server builds a multi-layer map including the proto-roadmap, the non-moving objects spatial perspective view and the road markings from the ground perspective view.

At action 2570, the map server providing the multi-layer map via a communications link to one or more additional autonomous units for guidance at a future time.

Other implementations of the method described in this section can include a non-transitory computer readable storage medium storing instructions executable by a processor to perform any of the methods described above. Yet another implementation of the method described in this section can include a system including a memory and one or more processors operable to execute instructions, stored in the memory, to perform any of the methods described above.

Figure 26:
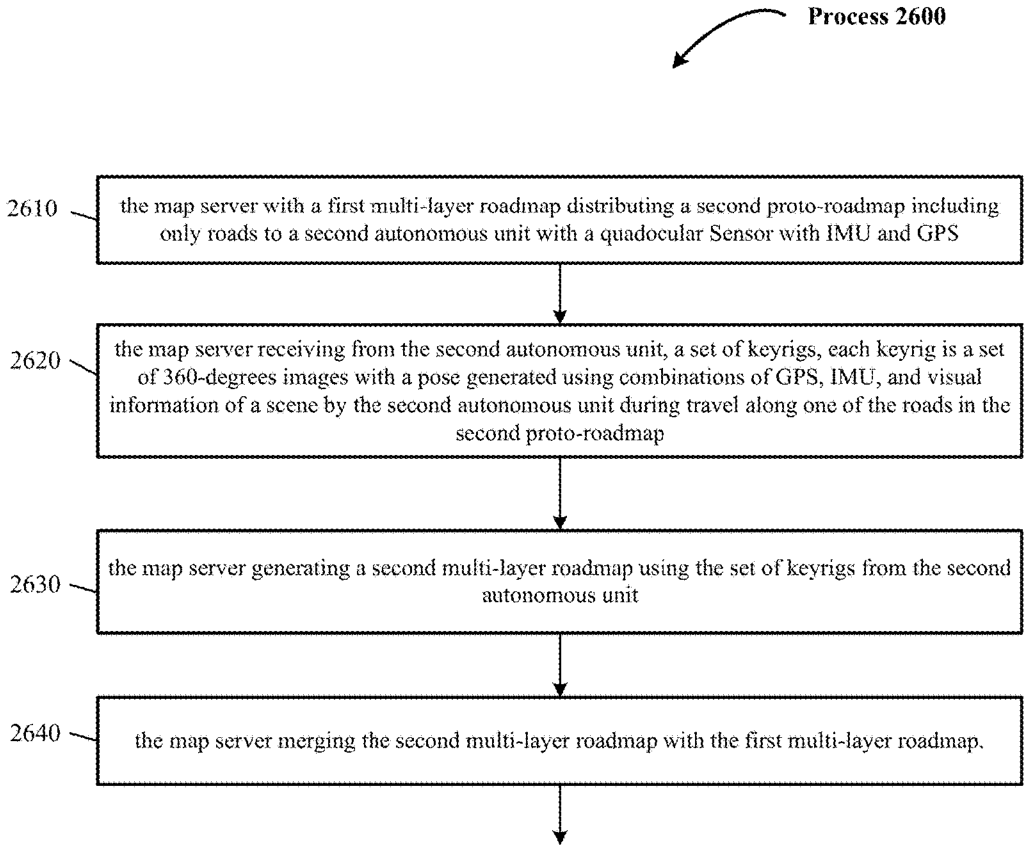
FIG. 26 is a representative method for updating a multi-layer map using information sourced by one or more moving autonomous units with quadocular-auxiliary sensory systems.

FIG. 26 is a representative method for updating a multi-layer map using information sourced by one or more moving autonomous units with quadocular-auxiliary sensory systems. Flowchart 2600 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 26. Multiple actions can be combined in some implementations. For convenience, this flowchart is described with reference to the system that carries out a method. The system is not necessarily part of the method.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as system overview of quadocular-auxiliary sensors and the map server, multi-layer map construction, etc.

FIG. 26 includes process 2600 that begins at action 2610, where the map server with a first multi-layer map distributes a second proto-roadmap including only roads to a second autonomous unit with a quadocular Sensor with IMU and GPS.

Process 2600 continues at action 2620 where the map server receives from the second autonomous unit, a set of keyrigs, each keyrig is a set of 360-degrees images with a pose generated using combinations of GPS, IMU, and visual information of a scene by the second autonomous unit during travel along one of the roads in the second proto-roadmap.

At action 2630, the map server generates a second multi-layer map using the set of keyrigs from the second autonomous unit with the help of ground perspective view builder 1503, spatial perspective view builder 1504 and semantic perspective view builder 1505 in map builder 1328.

At action 2640, the map server merges the second multi-layer map with the first multi-layer map with the help of the map merger 1506 in map builder 1328.

Other implementations of the method described in this section can include a non-transitory computer readable storage medium storing instructions executable by a processor to perform any of the methods described above. Yet another implementation of the method described in this section can include a system including a memory and one or more processors operable to execute instructions, stored in the memory, to perform any of the methods described above.

Map Construction by Map Server

Figure 27:
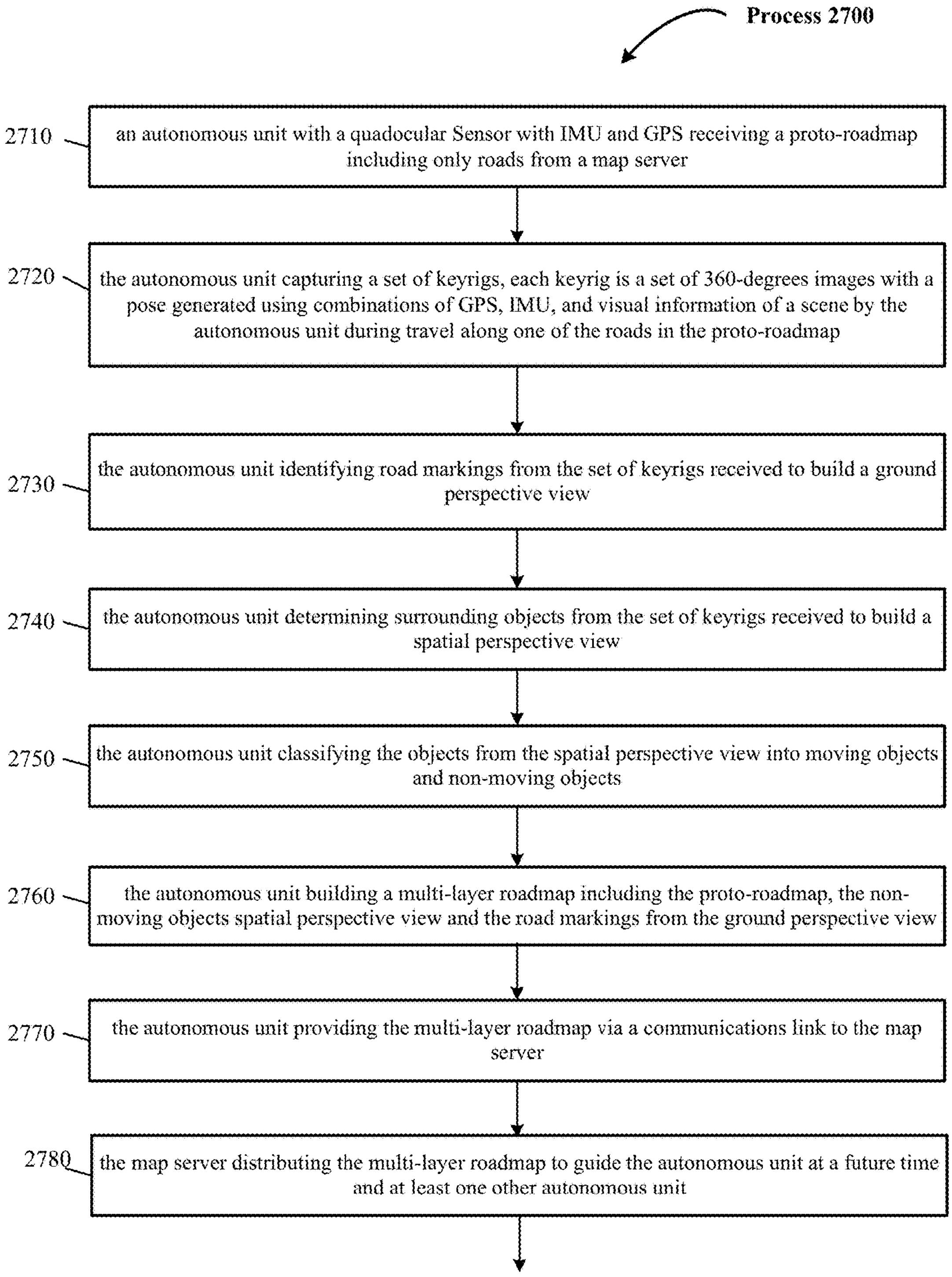
FIG. 27 is a representative method for building a multi-layer map by an autonomous unit with a quadocular-auxiliary sensory system.

FIG. 27 is a representative method for building a multi-layer map by an autonomous unit with a quadocular-auxiliary sensory system. Flowchart 2700 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 27. Multiple actions can be combined in some implementations. For convenience, this flowchart is described with reference to the system that carries out a method. The system is not necessarily part of the method.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as system overview of quadocular-auxiliary sensors and the map server, multi-layer map construction, etc.

FIG. 27 includes process 2700 that begins at action 2710, where an autonomous unit with a quadocular Sensor with IMU and GPS receives a proto-roadmap including only roads from a map server.

Process 2700 continues at action 2720 where the autonomous unit captures a set of keyrigs, each keyrig is a set of 360-degrees images with a pose generated using combinations of GPS, IMU, and visual information of a scene by the autonomous unit during travel along one of the roads in the proto-roadmap.

At action 2730, the autonomous unit identifies road markings from the set of keyrigs received to build a ground perspective view with the help of ground perspective view builder 903 in map building component 328.

At action 2740, the autonomous unit determines surrounding objects from the set of keyrigs received to build a spatial perspective view with the help of spatial perspective view builder 904 in map building component 328.

At action 2750, the autonomous unit classifies the objects from the spatial perspective view into moving objects and non-moving objects with the help of the semantic perspective view builder 905 in map building component 328.

At action 2760, the autonomous unit builds a multi-layer map including the proto-roadmap, the non-moving objects spatial perspective view and the road markings from the ground perspective view.

At action 2770, the autonomous unit provides the multi-layer map via a communications link to the map server.

At action 2780, the map server distributes the multi-layer map to guide the autonomous unit at a future time and at least one other autonomous unit.

Other implementations of the method described in this section can include a non-transitory computer readable storage medium storing instructions executable by a processor to perform any of the methods described above. Yet another implementation of the method described in this section can include a system including a memory and one or more processors operable to execute instructions, stored in the memory, to perform any of the methods described above.

Figure 28:
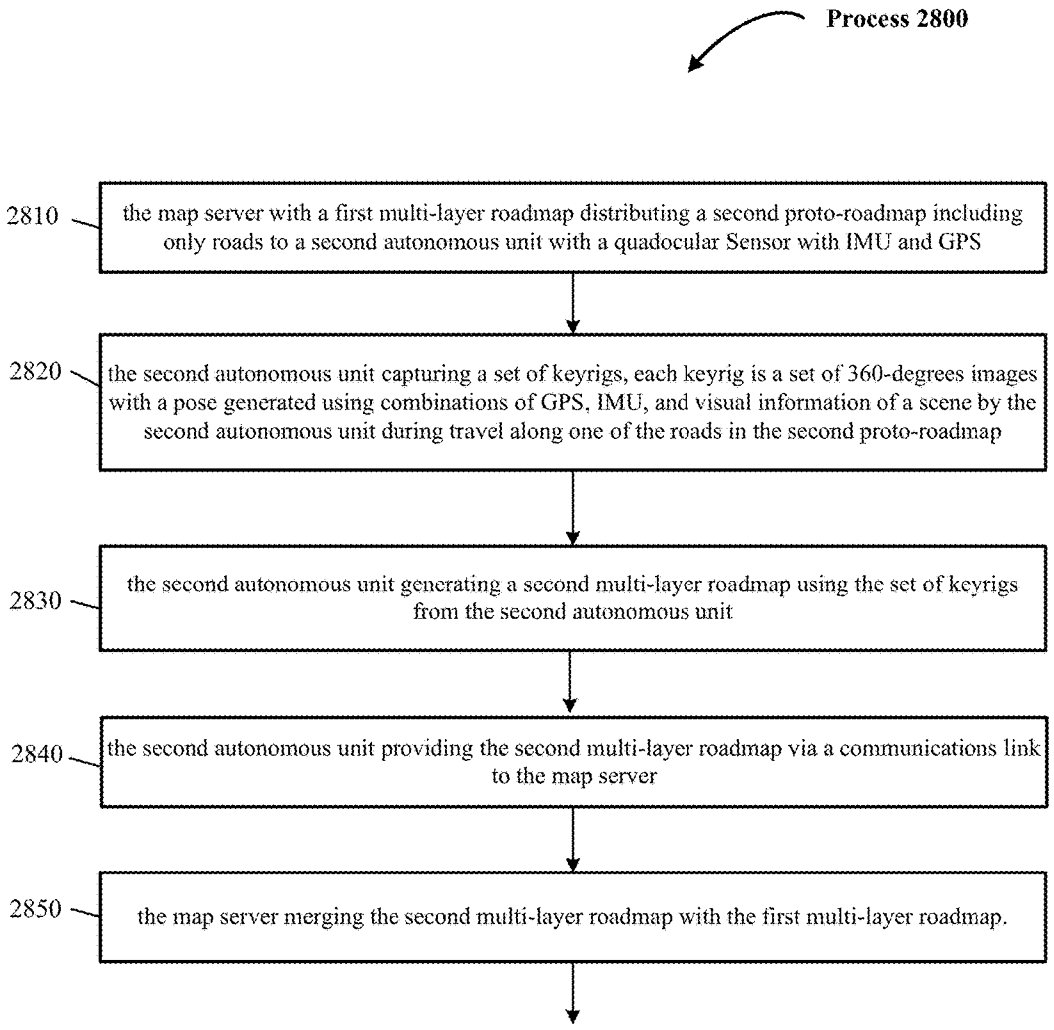
FIG. 28 is a representative method for updating a multi-layer map by an autonomous unit with a quadocular-auxiliary sensory system

FIG. 28 is a representative method for updating a multi-layer map by an autonomous unit with a quadocular-auxiliary sensory system. Flowchart 2800 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 28. Multiple actions can be combined in some implementations. For convenience, this flowchart is described with reference to the system that carries out a method. The system is not necessarily part of the method.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as system overview of quadocular-auxiliary sensors and the map server, multi-layer map construction, etc.

FIG. 28 includes process 2800 that begins at action 2810 when the map server with a first multi-layer map distributes a second proto-roadmap including only roads to a second autonomous unit with a quadocular Sensor with IMU and GPS.

Process 2800 continues at action 2820 the second autonomous unit captures a set of keyrigs, each keyrig is a set of 360-degrees images with a pose generated using combinations of GPS, IMU, and visual information of a scene by the second autonomous unit during travel along one of the roads in the second proto-roadmap.

At action 2830, the second autonomous unit generates a second multi-layer map using the set of keyrigs from the second autonomous unit with the help of ground perspective view builder 903, spatial perspective view builder 904 and semantic perspective view builder 905 in map building component 328.

At action 2840, the second autonomous unit provides the second multi-layer map via a communications link to the map server.

At action 2850, the map server merges the second multi-layer map with the first multi-layer map with the help of the map merger 1506 in map builder 1328.

Other implementations of the method described in this section can include a non-transitory computer readable storage medium storing instructions executable by a processor to perform any of the methods described above. Yet another implementation of the method described in this section can include a system including a memory and one or more processors operable to execute instructions, stored in the memory, to perform any of the methods described above.

Conclusion and Additional Implementations

Some particular implementations and features are described in the following discussion.

In one implementation, described is a methodology for building multi-layer maps of roads using information sourced by one or more moving autonomous units. The method includes: distributing a proto-roadmap including only roads to a first autonomous unit that includes at least a quad camera visual sensor and at least one selected from a GPS and an IMU, wherein the proto-roadmap is accurate to within 1 decimeter; receiving from the first autonomous unit, a set of keyrigs, each keyrig is a set of quad images with a pose generated using combinations of GPS, IMU, and visual information of a scene by the first autonomous unit during travel along one of the roads in the proto-roadmap; determining a ground perspective view including at least road marking information for at least one of the roads in the proto-roadmap from the visual information captured; wherein the ground perspective view is accurate to within 1 centimeter; determining a spatial perspective view including objects along at least one of the roads in in the proto-roadmap from the visual information captured; wherein the spatial perspective view is accurate to less than 1 centimeter; classifying objects from the spatial perspective view into moving objects and non-moving objects; building at least one multi-layer map including a stationary portion consisting of the proto-roadmap, the non-moving objects from the spatial perspective view and the road markings from the ground perspective view; and providing the multi-layer map via a communications link to one or more additional autonomous units to guide the one or more additional autonomous units at a future time. In some implementations, the method is implemented in a system which includes one or more autonomous units, including a first autonomous unit and a second autonomous unit, each autonomous unit including at least a quad camera visual sensor and at least one selected from a GPS and an IMU; and a map server to build multi-layer maps of roads using information sourced by the one or more autonomous units. In some implementations, the method is implemented in a system which includes a non-transitory computer readable medium to store instructions.

In some implementation, the method further includes: distributing a second proto-roadmap to a second autonomous unit; receiving from the second autonomous unit, a set of keyrigs, each keyrig is a set of quad images with a pose generated using combinations of GPS, IMU, and visual information of a scene by the second autonomous unit during travel along one of the roads in the second proto-roadmap; generating a second multi-layer map using the set of keyrigs from the second autonomous unit; and merging the second multi-layer map with the first multi-layer map.

In some implementation, the proto-roadmap and the second proto-roadmap both cover common location and further includes updating the multi-layer map using the second multi-layer map. In some implementation, the method further includes providing the proto-roadmap, the ground perspective view and the spatial perspective view as layers in a multi-layer map data structure. In some implementation, the method further includes generating several hundred thousand images during one hour of operation by an autonomous unit. In some implementation, the method further includes substantially contemporaneously tracking a position of moving autonomous units against multi-layer maps. In some implementation, the method further includes storing a time of day with the multi-layer map. In some implementation, the method further includes storing a weather condition with the multi-layer map. In some implementation, the method further includes building a semantic view from the spatial perspective view and objects classified as non-moving objects. In some implementation, the method further includes detecting when visual information is insufficient to determine the ground perspective view; and fall back to providing the proto-roadmap whenever visual information is insufficient. In some implementation, the method further includes detecting when visual information is insufficient to determine a spatial perspective view; and fall back to providing the ground perspective view whenever visual information is insufficient. In some implementation, the method further includes detecting when visual or semantic information is insufficient to classify objects; and fall back to providing the spatial perspective view whenever visual or semantic information is insufficient. In some implementation, the method further includes identifying an object to be included in the spatial perspective view: extracting 2D features of the object from a first 360-degrees image in a keyrig selected from the set of keyrigs provided by an autonomous unit; extracting 2D features of the object from a second 360-degrees image in the selected keyrig; receiving a position of the autonomous unit when the 360-degrees images were captured including longitude, and latitude as input; triangulating the 2D features from the first 360-degrees image and the 360-degrees second image to derive location for feature points of the object relative to the position of the autonomous unit; and generating for at least one feature point of the object, a global position, including longitude, latitude, and height and adding the global position and feature descriptors of the object to the spatial perspective view. In some implementation, the method further includes identifying a road marking to be included in the ground perspective view: extracting 2D features of the road marking from a first 360-degrees image in a keyrig selected from the set of keyrigs provided by an autonomous unit; extracting 2D features of the road marking from a 360-degrees second image in the selected keyrig; receiving a position of the autonomous unit when the 360-degrees images were captured including longitude, and latitude as input; triangulating the 2D features from the first 360-degrees image and the second 360-degrees image to derive location for feature points of the road marking relative to the position of an autonomous unit; and generating for at least one feature point of the road marking, a global position, including longitude and latitude, and adding the global position and feature descriptors of the road marking to the ground perspective view.

Also disclosed is an implementation that includes a method for automatically building multi-layer maps of roads by an autonomous unit that includes at least a quad camera visual sensor and at least one selected from a GPS and an IMU. The method including: receiving a proto-roadmap including only roads; wherein the proto-roadmap is accurate to within 1 decimeter; in the autonomous unit, capturing a set of keyrigs, each keyrig is a set of quad images with a pose generated using combinations of GPS, IMU, and visual information of a scene by the first autonomous unit during travel along one of the roads in the proto-roadmap; determining a ground perspective view including at least road marking information for at least one of the roads in the proto-roadmap from the visual information captured; wherein the ground perspective view is accurate to within 1 centimeter; determining a spatial perspective view including objects along at least one of the roads in in the proto-roadmap from the visual information captured; wherein the spatial perspective view is accurate to less than 1 centimeter; classifying objects from the spatial perspective view into moving objects and non-moving objects; building at least one multi-layer map including a stationary portion consisting of the proto-roadmap, the non-moving objects from the spatial perspective view and the road markings from the ground perspective view; and providing the multi-layer map via a communications link to a map server that stores and distributes multi-layer maps to guide the autonomous unit at a future time and at least one other autonomous unit. In some implementations, the method is implemented in a system which includes a map server to store multi-layer maps of roads using information sourced by one or more autonomous units; and one or more autonomous units, including a first autonomous unit, each autonomous unit including at least a quad camera visual sensor and at least one selected from a global positioning system and an IMU. In some implementations, the method is implemented in a system which includes a non-transitory computer readable medium to store instructions.

In some implementation, the method further includes providing moving objects to a further process that avoids potential collisions with moving objects and the autonomous unit. In some implementation, the method further includes substantially contemporaneously tracking a position of the autonomous unit against the multi-layer map. In some implementation, the method further includes further including providing the proto-roadmap, the ground perspective view and the spatial perspective view as layers in a multi-layer map data structure. In some implementation, the method further includes generating several hundred thousand images during one hour of operation by an autonomous unit. In some implementation, the method further includes storing a time of day with the multi-layer map. In some implementation, the method further includes storing a weather condition with the multi-layer map. In some implementation, the method further includes receiving semantic information from the map server and classifying the objects using the semantic information into moving objects and non-moving objects. In some implementation, the method further includes building a semantic view from the spatial perspective view and objects classified as non-moving objects. In some implementation, the method further includes detecting when visual information is insufficient to determine the ground perspective view; and fall back to providing the proto-roadmap whenever visual information is insufficient. In some implementation, the method further includes detecting when visual information is insufficient to determine a spatial perspective view; and fall back to providing the ground perspective view whenever visual information is insufficient. In some implementation, the method further includes detecting when visual or semantic information is insufficient to classify objects; and fall back to providing the spatial perspective view whenever visual or semantic information is insufficient. In some implementation, the method further includes identifying an object to be included in the spatial perspective view: extracting 2D features of the object from a first 360-degrees image in a keyrig selected from the set of keyrigs provided by an autonomous unit; extracting 2D features of the object from a second 360-degrees image in the selected keyrig; receiving a position of the autonomous unit when the 360-degrees images were captured including longitude, and latitude as input; triangulating the 2D features from the first 360-degrees image and the 360-degrees second image to derive location for feature points of the object relative to the position of the autonomous unit; and generating for at least one feature point of the object, a global position, including longitude, latitude, and height and adding the global position and feature descriptors of the object to the spatial perspective view.

In some implementation, the method further includes a road marking to be included in the ground perspective view: extracting 2D features of the road marking from a first 360-degrees image in a keyrig selected from the set of keyrigs provided by an autonomous unit; extracting 2D features of the road marking from a 360-degrees second image in the selected keyrig; receiving a position of the autonomous unit when the 360-degrees images were captured including longitude, and latitude as input; triangulating the 2D features from the first 360-degrees image and the second 360-degrees image to derive location for feature points of the road marking relative to the position of an autonomous unit; and generating for at least one feature point of the road marking, a global position, including longitude and latitude, and adding the global position and feature descriptors of the road marking to the ground perspective view.

The terms and expressions employed herein are used as terms and expressions of description and not of limitation, and there is no intention, in the use of such terms and expressions, of excluding any equivalents of the features shown and described or portions thereof. In addition, having described certain implementations of the technology disclosed, it will be apparent to those of ordinary skill in the art that other implementations incorporating the concepts disclosed herein can be used without departing from the spirit and scope of the technology disclosed. Accordingly, the described implementations are to be considered in all respects as only illustrative and not restrictive.

What is claimed is:

1. A method for building multi-layer maps of roads using information sourced by one or more moving autonomous units, including:

- distributing a proto-roadmap including only roads to a first autonomous unit that includes at least a quad camera visual sensor and at least one selected from a global positioning system and an inertial measurement unit;
- receiving from the first autonomous unit a set of keyrigs, each keyrig is a set of quad images with a pose generated using combinations of global positioning system, inertial measurement unit, and visual information of a scene by the first autonomous unit during travel along one of the roads in the proto-roadmap;
- determining a ground perspective view including at least road marking information for at least one of the roads in the proto-roadmap from the visual information captured;
- determining a spatial perspective view including objects along at least one of the roads in the proto-roadmap from the visual information captured;
- classifying objects from the spatial perspective view into moving objects and non-moving objects;
- building at least one multi-layer map including a stationary portion consisting of the proto-roadmap, the non-moving objects from the spatial perspective view and the road markings from the ground perspective view, wherein at least one multi-layer map is accurate within 10 centimeters; and
- providing the multi-layer map via a communications link to one or more additional autonomous units to guide the one or more additional autonomous units at a future time.

2. The method of claim 1, further including at least one multi-layer map with an accuracy within 5 centimeters.

3. The method of claim 1, further including:

- distributing a second proto-roadmap to a second autonomous unit while hosting a first multi-layer map;
- receiving from the second autonomous unit a set of keyrigs, each keyrig is a set of quad images with a pose generated using combinations of global positioning system, inertial measurement unit, and visual information of a scene by the second autonomous unit during travel along one of the roads in the second proto-roadmap;
- generating a second multi-layer map using the set of keyrigs from the second autonomous unit; and
- merging the second multi-layer map with the first multi-layer map.

4. The method of claim 3, wherein the proto-roadmap and the second proto-roadmap both cover common location and further including updating the multi-layer map using the second multi-layer map.

5. The method of claim 1, further including providing the proto-roadmap, the ground perspective view and the spatial perspective view as layers in a multi-layer map data structure.

6. The method of claim 1, further including generating several hundred thousand images during one hour of operation by an autonomous unit.

7. The method of claim 1, further including substantially contemporaneously tracking a position of moving autonomous units against multi-layer maps.

8. The method of claim 1, further including storing a time of day with the multi-layer map.

9. The method of claim 1, further including storing a weather condition with the multi-layer map.

10. The method of claim 1, further including: building a semantic view from the spatial perspective view and objects classified as non-moving objects.

11. The method of claim 1, further including:

- detecting when visual information is insufficient to determine the ground perspective view; and
- fall back to providing the proto-roadmap whenever visual information is insufficient.

12. The method of claim 1, further including:

- detecting when visual information is insufficient to determine a spatial perspective view; and
- fall back to providing the ground perspective view whenever visual information is insufficient.

13. The method of claim 1, further including:

- detecting when visual or semantic information is insufficient to classify objects; and
- fall back to providing the spatial perspective view whenever visual or semantic information is insufficient.

14. The method of claim 1, further including identifying an object to be included in the spatial perspective view:

- extracting a first set 2D features of the object from a first 360-degrees image in a keyrig selected from a set of keyrigs provided by an autonomous unit;
- extracting a second set of 2D features of the object from a second 360-degrees image in the selected keyrig;
- receiving a position of the autonomous unit when the 360-degrees images were captured including longitude and latitude as input;
- triangulating the first set of 2D features from the first 360-degrees image and the second set of 2D features from the 360-degrees second image to derive location for feature points of the object relative to the position of the autonomous unit; and generating for at least one feature point of the object, a global position, including longitude, latitude, and height and adding the global position and feature descriptors of the object to the spatial perspective view.

15. The method of claim 1, further including identifying a road marking to be included in the ground perspective view:

extracting a first set of 2D features of the road marking from a first 360-degrees image in a keyrig selected from a set of keyrigs provided by an autonomous unit;

extracting a second set of 2D features of the road marking from a 360-degrees second image in the selected keyrig;

receiving a position of the autonomous unit when the 360-degrees images were captured including longitude and latitude as input;

triangulating the first set of 2D features from the first 360-degrees image and the second set of 2D features from the second 360-degrees image to derive location for feature points of the road marking relative to the position of an autonomous unit; and generating for at least one feature point of the road marking, a global position, including longitude and latitude, and adding the global position and feature descriptors of the road marking to the ground perspective view.

16. A system, including:

one or more autonomous units, including a first autonomous unit and a second autonomous unit, each autonomous unit including at least a quad camera visual sensor and at least one selected from a global positioning system and an inertial measurement unit; and a map server to build multi-layer maps of roads using information sourced by the one or more autonomous units, and configured to:

distributing a proto-roadmap including only roads to a first autonomous unit that includes at least a quad camera visual sensor and at least one selected from a global positioning system and an inertial measurement unit;

receiving from the first autonomous unit a set of keyrigs, each keyrig is a set of quad images with a pose generated using combinations of global positioning system, inertial measurement unit, and visual information of a scene by the first autonomous unit during travel along one of the roads in the proto-roadmap;

determining a ground perspective view including at least road marking information for at least one of the roads in the proto-roadmap from the visual information captured;

determining a spatial perspective view including objects along at least one of the roads in the proto-roadmap from the visual information captured;

classifying objects from the spatial perspective view into moving objects and non-moving objects;

building at least one multi-layer map including a stationary portion consisting of the proto-roadmap, the non-moving objects from the spatial perspective view and the road markings from the ground perspective view, wherein at least one multi-layer map is accurate within 10 centimeters; and providing the multi-layer map via a communications link to one or more additional autonomous units to guide the one or more additional autonomous units at a future time.

17. The system of claim 16, further including at least one multi-layer map with an accuracy within 5 centimeters.

18. A non-transitory computer readable medium storing instructions for building multi-layer maps of roads using information sourced by one or more moving autonomous units, which instructions when executed by a processor perform:

distributing a proto-roadmap including only roads to a first autonomous unit that includes at least a quad camera visual sensor and at least one selected from a global positioning system and an inertial measurement unit;

receiving from the first autonomous unit a set of keyrigs, each keyrig is a set of quad images with a pose generated using combinations of global positioning system, inertial measurement unit, and visual information of a scene by the first autonomous unit during travel along one of the roads in the proto-roadmap;

determining a ground perspective view including at least road marking information for at least one of the roads in the proto-roadmap from the visual information captured;

determining a spatial perspective view including objects along at least one of the roads in the proto-roadmap from the visual information captured;

classifying objects from the spatial perspective view into moving objects and non-moving objects;

building at least one multi-layer map including a stationary portion consisting of the proto-roadmap, the non-moving objects from the spatial perspective view and the road markings from the ground perspective view, wherein at least one multi-layer map is accurate within 10 centimeters; and providing the multi-layer map via a communications link to one or more additional autonomous units to guide the one or more additional autonomous units at a future time.

19. The non-transitory computer readable medium of claim 18, further including at least one multi-layer map with an accuracy within 5 centimeters.

* * * * *